United States Patent
Chelian et al.

(10) Patent No.: US 9,412,051 B1
(45) Date of Patent: Aug. 9, 2016

(54) NEUROMORPHIC IMAGE PROCESSING EXHIBITING THALAMUS-LIKE PROPERTIES

(71) Applicant: HRL Laboratories, LLC, Malibu, CA (US)

(72) Inventors: Suhas E. Chelian, Culver City, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 98 days.

(21) Appl. No.: 14/296,409

(22) Filed: Jun. 4, 2014

Related U.S. Application Data

(60) Provisional application No. 61/862,311, filed on Aug. 5, 2013.

(51) Int. Cl.
*G06K 9/00* (2006.01)
*G06K 9/66* (2006.01)
*G06N 3/04* (2006.01)

(52) U.S. Cl.
CPC ... *G06K 9/66* (2013.01); *G06N 3/04* (2013.01)

(58) Field of Classification Search
None
See application file for complete search history.

(56) References Cited

U.S. PATENT DOCUMENTS

| | | |
|---|---|---|
| 5,274,748 A | 12/1993 | Boser et al. |
| 8,588,899 B2 | 11/2013 | Schiff |
| 8,909,576 B2 * | 12/2014 | Akopyan ............... G06N 3/049 706/27 |
| 8,977,582 B2 * | 3/2015 | Richert .................... G06K 9/62 382/156 |
| 9,047,568 B1 * | 6/2015 | Fisher .................. G06N 3/0472 |

OTHER PUBLICATIONS

Indiveri et al., "Neuromorphic silicon neuron circuits," Frontiers Neurosci., vol. 5, No. 73, pp. 1-23, 2011.
Srinivasa et al., "Analog learning systems of neuromorphic adaptive plastic scalable electronics," IEEE Pulse, vol. 3, No. 1, Jan.-Feb., pp. 51-56, 2012.
Bi et al., "Activity-induced synaptic modifications in hippocampal culture: Dependence on spike timing, synaptic strength and cell type," J. Neurosci. vol. 18, No. 24, pp. 10464-10472, 1998.
Izhikevich, "Polychronization: Computation with spikes," Neural Comput., vol. 18, No. 2, pp. 245-282, 2006.
Izhikevich et al., "Spike-timing Dynamics of Neuronal Groups," Cerebral Cortex, vol. 14, No. 8, pp. 933-944, 2004.

(Continued)

*Primary Examiner* — Daniel Mariam
(74) *Attorney, Agent, or Firm* — North Shore Associates

(57) ABSTRACT

Neuromorphic image processing employs neuromorphic neurons arranged as relay neurons, interneurons and reticular neurons to process image data. A neuromorphic image processing channel includes relay neurons and interneurons to receive spiking input signals. The interneurons provide feedforward inhibition to the relay neurons. The neuromorphic image processing channel also includes reticular neurons to receive output spiking signals from and to provide feedback inhibition to the relay neurons. A neuromorphic image processing system includes a first neuromorphic image processing (NIP) channel to receive a first set of spiking input signals and a second NIP channel to receive a second set of spiking input signals. The neuromorphic image processing system also includes reticular neurons to receive output spiking signals from and to provide feedback inhibition to both the first and second NIP channels.

26 Claims, 5 Drawing Sheets

(56) References Cited

OTHER PUBLICATIONS

Chen et al., "Real-time simulation of biologically realistic stochastic, neurons in VLSI," IEEE Trans. Neural Netw., vol. 21, No. 9, pp. 1511-1517, Sep. 2010.
Khan et al., "SpiNNaker: Mapping neural networks onto a massively-parallel chip multiprocessor," in Proc. IEEE Int. Joint Conf. Neural Netw. World Congr. Comput. Intell., Jun. 2008, pp. 2849-2856.
Schemmel et al., "Implementing synaptic plasticity in a VLSI spiking neural network model," in Proc. Int. Joint Conf. Neural Netw., 2006, pp. 1-6.
Schemmel et al., "A wafer-scale neuromorphic hardware system for large-scale neural modeling," in Proc. IEEE Int. Symp. Circuits Syst., May-Jun. 2010, pp. 1947-1950.
Hodgkin et al., "A quantitative description of membrane current and application to conduction and excitation in nerve," J. Phys., vol. 117, No. 4, pp. 500-544, 1952.
Izhikevich, "Which model to use for cortical spiking neurons?" IEEE Trans. Neural Netw., vol. 15, No. 5, pp. 1063-1070, Sep. 2004.
Fitzhugh, "Impulses and physiological states in theoretical models of nerve membrane," Biophys. J., vol. 1, No. 6, pp. 445-466, 1961.
Brette et al., "Adaptive exponential integrate and fire model as an effective description of neuronal activity," J. Neurophys., vol. 94, No. 5, pp. 3637-3642, 2005.
Song et al., "Competitive Hebbian Learning Through Spike-Timing Dependent Synaptic Plasticity," Nature Neuroscience, vol. 3, 2000, pp. 919-926.
Fuhrmann et al., "Spike frequency adaptation and neocortical rhythms," J. Neurophys., vol. 88, No. 2, pp. 761-770, 2002.
Wu et al., "Contribution of AMPA, NMDA, and GABA(A) receptors to temporal pattern of postsynaptic responses in the inferior colliculus of the rat," J. Neurosci., vol. 24, No. 19, pp. 4625-4634, 2004.
Minkovich et al., "Programming Time-Multiplexed Reconfigurable Hardware Using a Scalable Neuromorphic Compiler," IEEE Trans. on Neural Networks and Learning Systems, vol. 23, No. 6, Jun. 2012, pp. 889-910.
Gorzelic et al., "Model-based rational feedback controller design for closed-loop deep brain stimulation of Parkinson's disease," J. Neural Eng., vol. 10, 2013, pp. 026016-1 to 026016-16.
Schiff et al., Towards model-based control of parkinson's disease. Philosophical Transactions of the Royal Society A: Mathematical, Physical and Engineering Sciences, 368, 2010, pp. 2269-2308.
Dethier et al., "A Brain-Machine Interface Operating with a Real-Time Spiking Neural Network Control Algorithm," Advances in Neural Information Processing Systems 24, 2012, pp. 2213-2221.
Santaniello et al., "Adaptive feedback control in deep brain stimulation: a simulation study," 17th IFAC World Congress, Seoul, Korea, Jul. 6-11, 2008, pp. 11624-11629.
Little et al., "What brain signals are suitable for feedback control of deep brain stimulation in Parkinson's disease?," Ann. N.Y. Acad. Sci., vol. 1265, 2012, pp. 9-24.
Rubin et al., "High frequency stimulation of the subthalamic nucleus eliminates pathological thalamic rhythmicity in a computational model," Journal of Computational Neuroscience, vol. 16(3), 2004, pp. 211-235.
Abarbanel et al., "Estimation of parameters in nonlinear systems using balanced synchronization," Phys. Rev. E 77, 2008, 016208, pp. 1-14.
Agarwal et al., "The effects of dbs patterns on basal ganglia activity and thalamic relay," J. of Computational Neuroscience, 33, 2012, pp. 151-167.
Aprasoff et al., "Correlations in state space can cause sub-optimal adaptation of optimal feedback control models," J. of Computational Neuroscience, 32, 2012, pp. 297-307.
Cagnan et al., "Frequency-selectivity of a thalamocortical relay neuron during parkinsons disease and deep brain stimulation: a computational study," European Journal of Neuroscience, 30(7), 2009, pp. 1306-1317.
Dorval et al., "Deep brain stimulation alleviates parkinsonian bradykinesia by regularizing pallidal activity," J. of Neurophysiology, 104(2), 2010, pp. 911-921.
Feng et al., "Optimal deep brain stimulation of the subthalamic nucleusa computational study," J. of Computational Neuroscience, 23, 2007, pp. 265-282.
Frank et al., "Dynamic dopamine modulation in the basal ganglia: A neurocomputational account of cognitive deficits in medicated and nondedicated parkinsonism," J. of Cognitive Neuroscience 17(1), 2005, pp. 51-72.
Guo et al., "Multi-site stimulation of subthalamic nucleus diminishes thalamocortical relay errors in a biophysical network model," Neural Networks 24(6), 2011, pp. 602-616.
Guo et al., "Thalamocortical relay fidelity varies across subthalamic nucleus deep brain stimulation protocols in a data-driven computational model," Journal of Neurophysiology, 99(3), Mar. 2008, pp. 1477-1492.
Hahn et al., "Modeling shifts in the rate and pattern of subthalamopallidal network activity during deep brain stimulation," J. of Computational Neuroscience, 28, 2010, pp. 425-441.
Leblois et al., "Competition between feedback loops underlies normal and pathological dynamics in the basal ganglia," J. of Neuroscience, 26(13), 2006, pp. 3567-3583.
Meijer et al., "From parkinsonian thalamic activity to restoring thalamic relay using deep brain stimulation: new insights from computational modeling," J. of Neural Engineering, 8(6), 2011, 066005, pp. 1-13.
Pirini et al., "A computational modelling approach to investigate different targets in deep brain stimulation for parkinsons disease," J. of Computational Neuroscience, 26, 2009, pp. 91-107.
Rosin et al., "Closed-loop deep brain stimulation is superior in ameliorating parkinsonism," Neuron, 72(2), 2011, pp. 370-384.
Rubin et al., "Basal ganglia activity patterns in parkinsonism and computational modeling of their downstream effects," European Journal of Neuroscience 36(2), 2012, pp. 2213-2228.
Ullah et al., "Tracking and control of neuronal hodgkin-huxley dynamics," Phys. Rev. E, 79(4), Apr. 2009, 040901, pp. 1-4.
Ullah et al., "Assimilating seizure dynamics," PLoS Comput Biol, 6(5), May 2010, e1000776, pp. 1-12.
Voss et al., "Nonlinear dynamical system identification from uncertain and indirect measurements," I. J. Bifurcation and Chaos, 14(6), 2004, pp. 1905-1933.

\* cited by examiner

NEUROMORPHIC IMAGE PROCESSING EXHIBITING THALAMUS-LIKE PROPERTIES

CROSS-REFERENCE TO RELATED APPLICATIONS

This application claims priority from U.S. Provisional Patent Application, Ser. No. 61/862,311, filed Aug. 5, 2013, the entire contents of which is incorporated herein by reference.

STATEMENT REGARDING FEDERALLY SPONSORED RESEARCH OR DEVELOPMENT

This invention was made with Government support under Contract No. HR0011-09-C-0001, SyNAPSE, awarded by DARPA. The Government has certain rights in the invention.

BACKGROUND

1. Technical Field

The invention relates to analog circuits, systems and related signal processing. In particular, the invention relates to image processing using biologically inspired neuromorphic circuits and systems.

2. Description of Related Art

Complex, real-time and near real-time processing and control applications are becoming more commonplace and important. Examples include, but are not limited to, image processing, especially real-time image processing, from a large array of sensors (e.g., a focal plane array of optical sensors) that may involve simultaneous processing of multiple, parallel channels. Such image processing often presents significant design challenges including, but not limited to, providing implementations that have sufficient processing capability and at the same time exhibit reasonable energy efficiency. Neural networks, especially neural networks using neuromorphic circuits (e.g., neuromorphic neurons and synapses) and related circuit topologies, may offer a solution to some of these significant obstacles associated with the design and implementation of real-time processing and control.

For example, retino-thalamic visual processing of the output of retinal ganglion cells may provide a path to efficient image processing of real-time images. However, while neuromorphic models based on a spiking thalamus model have been developed, these models generally focus on abstract thalamocortical features including rhythms and synchrony of thalamocortical functionality associated with the image processing. In particular, existing retino-thalamus models typically fail to provide form and motion processing of images with spiking dynamics. Hence, challenges remain in developing practical implementations of neuromorphic retino-thalamic models and systems that may be applied to a wide variety of practical image processing applications which, by necessity, involve at least some form and motion processing of images.

BRIEF SUMMARY

In some embodiments, a neuromorphic image processing channel is provided. The neuromorphic image processing channel comprises a plurality of relay neurons to receive spiking input signals. The neuromorphic image processing channel further comprises a plurality of interneurons to provide feed-forward inhibition to relay neurons of the relay neuron plurality according to a one-to-many mapping. An interneuron of the interneuron plurality is to receive a set of the spiking input signals according to a many-to-one mapping into the interneuron. The neuromorphic image processing channel further comprises a plurality of reticular neurons to receive output spiking signals from relay neurons of the relay neuron plurality and to provide feedback inhibition to the relay neurons. The relay neurons, the interneurons, and the reticular neurons of the respective pluralities comprise thalamus-like neuromorphic neurons. In addition, a quantity of the relay neurons exceeds each of a quantity of the interneurons and a quantity of the reticular neurons of the respective pluralities.

In some embodiments, a neuromorphic image processing system is provided. The neuromorphic image processing system comprises a first neuromorphic image processing (NIP) channel having first relay neurons and first interneurons, both of which are to receive a first set of spiking input signals. The first NIP channel interneurons are to provide feed-forward inhibition to the first NIP channel relay neurons. The neuromorphic image processing system further comprises a second NIP channel having second relay neurons and second interneurons, both of which are to receive a second set of spiking input signals. The second NIP channel interneurons are to provide feed-forward inhibition to the second NIP channel relay neurons. The neuromorphic image processing system further comprises reticular neurons that are to receive output spiking signals from both the first NIP channel relay neurons and the second NIP channel relay neurons and to provide feedback inhibition to the first NIP channel relay neurons and the second NIP channel relay neurons. The first and second relay neurons, the first and second interneurons, and the reticular neurons comprise neuromorphic neurons that exhibit thalamus-like properties and the spiking input signals represent image data.

In some embodiments, a method of neuromorphic image processing exhibiting thalamus-like properties is provided. The method of neuromorphic image processing comprises receiving spiking input signals with a plurality of relay neurons and a plurality of interneurons. The spiking input signals are provided by an image processing input source. An interneuron of the interneurons plurality receives a set of the spiking input signals according to a many-to-one mapping of the set of spiking input signals into the interneuron. The method of neuromorphic image processing further comprises providing feed-forward inhibition to the plurality of relay neurons from the plurality of interneurons according to a one-to-many mapping of an interneuron of the interneuron plurality to a set of relay neurons corresponding to the interneuron. The method of neuromorphic image processing further comprises receiving output spiking signals from the plurality of relay neurons with a plurality of reticular neurons and providing feedback inhibition to the plurality of relay neurons from the plurality of reticular neurons. The relay neurons, the interneurons, and the reticular neurons of the respective pluralities comprise neuromorphic neurons with thalamus-like properties. Further, a quantity of the relay neurons exceeds each of a quantity of interneurons and a quantity of reticular neurons of the respective pluralities.

BRIEF DESCRIPTION OF THE DRAWINGS

Various features of embodiments in accordance with the principles described herein may be more readily understood with reference to the following detailed description taken in conjunction with the accompanying drawings, where like reference numerals designate like structural elements, and in which.

Figure 1A:
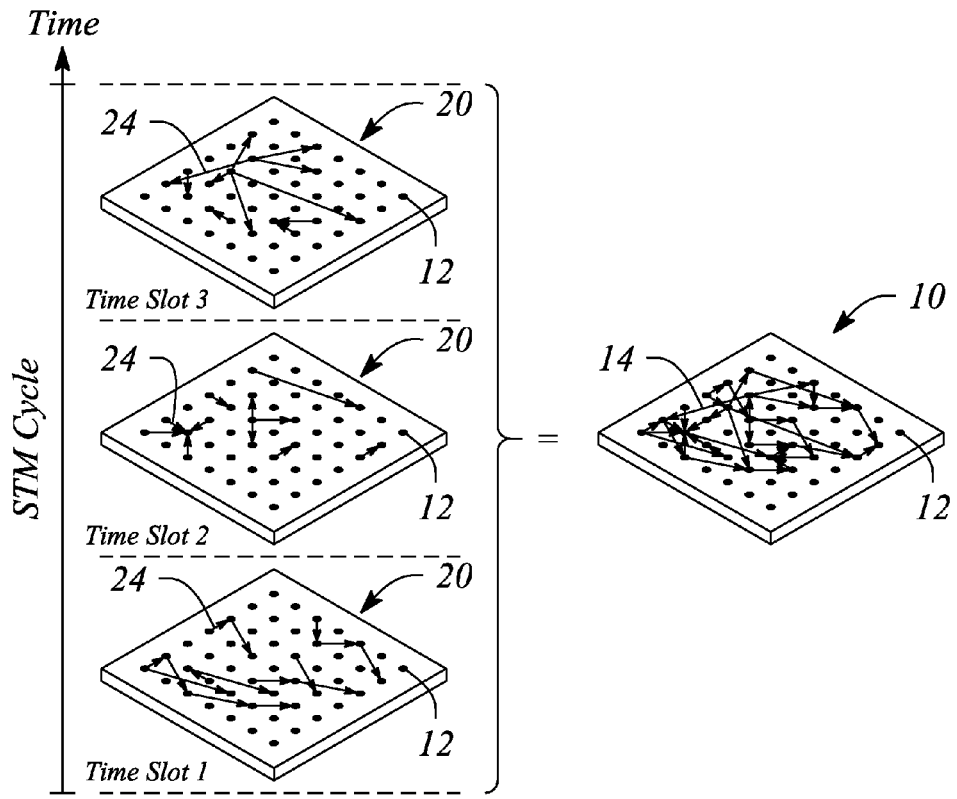
FIG. 1A illustrates a schematic representation of synaptic time multiplexing, according to an embodiment consistent with the principles of the present invention.

Certain examples and embodiments have other features that are one of in addition to and in lieu of the features illustrated in the above-referenced figures. These and other features are detailed below with reference to the above-referenced figures.

DETAILED DESCRIPTION

Embodiments consistent with the principles of the present invention provide neuromorphic image processing based on a retino-thalamic model with spiking dynamics. In particular, embodiments of the present invention provide neuromorphic image processing based on thalamocortical processing of visual pathways between a retina and a visual cortex. Moreover, the neuromorphic image processing may provide form and motion processing of images, according to some embodiments of the present invention. For example, in some embodiments, separate channels may be provided that support form processing (e.g., color processing) and that support motion processing of image data. These separate channels may mimic the separate parvocellular and magnocellular pathways in a biological thalamus, for example. As such, embodiments of the present invention may provide neuromorphic image processing that can distinguish between and therefore facilitate form and motion in images, in some embodiments.

Embodiments of the present invention are modeled on biological retino-thalamic processing of visual information received by the eyes. In biological retino-thalamic visual processing, retinal ganglion cells (RGCs) that project from a retina of the eye may exhibit either ON-center, OFF-surround activity or OFF-center, ON-surround activity. Further the RGCs may be broadly grouped into parvocellular and magnocellular types. Roughly ninety percent (90%) of the RGCs project to and connect with a lateral geniculate nucleus (LGN) of the thalamus. Light focused onto the retina produces spiking signals as an output that is carried by the RGCs and serves as spiking input signals to the thalamus. The spiking input signals may therefore be broadly characterized as being parvocellular spiking input signals or magnocellular spiking input signals. The spiking input signals may also be broadly characterized as arising RGCs that exhibit either the ON-center, OFF-surround activity or the OFF-center, ON-surround activity. As such, the parvocellular spiking inputs to the thalamus may be both so-called 'ON parvocellular' inputs and 'OFF parvocellular' inputs, while similarly the magnocellular spiking inputs to the thalamus may be both so-called 'ON magnocellular' inputs and 'OFF magnocellular' inputs.

The thalamus is divided into six layers (layers 1-6), three of the six layers being associated with each of two eyes of a pair of eyes. Layers 1 and 2 are connected to receive the ON and OFF magnocellular inputs from retinas of the two eyes with one layer (e.g., layer 1) receiving the magnocellular inputs from the respective retinas (i.e., the RGCs) of a first eye of the pair and a second layer (e.g., layer 2) receiving the magnocellular inputs from the retina of the second eye. Layers 3-6 receive the ON and OFF parvocellular inputs from the respective retinas (i.e., the RGCs) of the two eyes. Further, layers 1, 4 and 6 receive spiking input signals from the contralateral visual field of the eyes, while layers 2, 3 and 5 receive spiking input signals from the ipsilateral visual field. Once received, the layers 1 and 2 project to a '4Cα' layer of a primary visual cortex of the brain and layers 3-6 project to a '4Cβ' layer of the primary visual cortex.

In general, the parvocellular inputs provided by the RGCs to the thalamus exhibit higher sensitivity to color contrast and spatial frequency and lower sensitivity to luminance contrast and temporal frequency when compared to the magnocellular inputs. Conversely, the magnocellular inputs exhibit higher sensitivity to luminance contrast and temporal frequency and lower sensitivity to color contrast and spatial frequency when compared to the parvocellular inputs. Further, neurons (e.g., relay neurons of the thalamus) often exhibit center-surround cone opponency (referring to a cone receptor cell of the retina). Center-surround cone opponency may facilitate detection of changes in color contrast associated with the parvocellular inputs to these neurons. Magnocellular inputs to neurons (e.g., the ON magnocellular RGCs) may induce the neurons that receive these inputs to respond preferentially to motion even though due to isotropic receptive fields, direction selectivity may be weak. The response to magnocellular inputs may result in the receiving neurons having higher temporal sensitivity than other neurons such as those that receive parvocellular inputs, for example. As such, by definition herein, a spiking input signal that exhibits characteristics associated with parvocellular inputs (e.g., higher sensitivity to color contrast and spatial frequency) is a 'parvocellular spiking input signal.' Further, a spiking input signal that exhibits characteristics associated with magnocellular inputs (e.g., higher sensitivity to luminance contrast and temporal frequency) is a 'magnocellular spiking input signal,' by definition herein. The parvocellular spiking input signals may be associated with form or color processing of images and the magnocellular spiking input signals may be associated with motion processing of images, according to some embodiments.

As such, herein neuromorphic image processing is defined as being 'thalamus-like' or having 'thalamus-like properties' when the neuromorphic image processing exhibits or includes aspects, properties or characteristics that mimic the above-described biological retino-thalamic processing of visual information. For example, a neuromorphic image processor having groups of neuromorphic neurons (e.g., relay neurons, interneurons, reticular neurons, etc.) interconnected to perform in a manner analogous to similar groups of biological neurons found in the biological thalamus is a 'thalamus-like neuromorphic image processor,' by definition herein. Moreover, neuromorphic neurons of a neuromorphic image processor that mimic the functionality of various biological thalamocortical neurons of the thalamus are similarly defined herein as 'thalamus-like neuromorphic neurons.' For example, a neuromorphic neuron that exhibits both tonic firing patterns and burst firing patterns with the burst firing patterns occurring after hyperpolarization (i.e., a post-hyperpolarization burst firing pattern) may mimic a biological relay neuron of the thalamus. Such a relay neuron-mimicking neuromorphic neuron is a 'thalamus-like neuromorphic neuron,' by definition herein. Similarly, a neuromorphic neuron that exhibits both tonic firing patterns and burst firing patterns consistent with activity observed in a biological thalamocortical reticular neuron or that exhibits post-hyperpolarization rebound spiking substantially without a burst mode consistent with activity observed in a biological thalamocortical interneuron is, by definition herein, a 'thalamus-like neuromorphic neuron.'

As used herein, a 'neuromorphic network' is defined as a neuro-biologically inspired computational network configured to mimic characteristics of an interconnected network of biological neurons. Similarly, a 'neuromorphic neuron' is defined as a neural or neuromorphic construct that mimics or emulates the neuro-biological characteristics of a biological neuron. In particular, by definition herein, 'neuromorphic' when employed in conjunction with a network or elements thereof means a hardware construct, a software construct, or a combination hardware-software construct comprising elements or modules configured to mimic or represent the operation of biological neurons and any of various interconnections therebetween. For example, neuromorphic neurons may be interconnected within the neuromorphic network by other elements configured to mimic or represent synapses (i.e., neuromorphic synapses).

In general, a neuromorphic network may be implemented using software (i.e., executed by a processor), hardware-based circuits, or a combination of software and hardware-based circuits, by definition herein. In particular, in various examples, the neuron may comprise any of a number of neuromorphic constructs including, but not limited to, a complimentary metal oxide semiconductor (CMOS) neuron circuit and a memristor-based synapse circuit. In other embodiments, the neuron may be a software-based neuron or a firmware-based neuron that, in whole or in part, employs a software simulation of the neuro-biological characteristics of the biological neuron. According to various embodiments, the neuromorphic neuron may be implemented based on any of a number of neuromorphic neuron implementations including, but not limited to, a Hodgkin-Huxley neuron, an Izhikevich neuron, and various other neuromorphic neurons and neuron models having performance characteristics substantially similar to one or both of the Hodgkin-Huxley and Izhikevich neurons. Further discussion of neuromorphic neuron implementations may be found, for example, in FIG. 2 of E. M. Izhikevich, "Which Model to Use for Cortical Spiking Neurons?," *IEEE Transactions on Neural Networks*, 15:1043-1070, 2004, incorporated by reference herein in its entirety. The Hodgkin-Huxley neuron is described by A. L. Hodgkin and A. F. Huxley, "A quantitative description of membrane current and application to conduction and excitation in nerve," *J. Physiol.*, Vol. 117, 1954, pp. 500-544, also incorporated by reference herein in its entirety.

Herein, a 'neuromorphic synapse' or simply a 'synapse' when used herein with respect to neuromorphic networks, by definition, comprises a neuromorphic construct that mimics or emulates the neuro-biological characteristics of a biological synapse. In a basic form, the synapse provides an interface between neuromorphic neurons. For example, the interface may merely translate signals from a received form to a form that is compatible with the neuromorphic neuron. In some embodiments, the synapse may comprise any of a number of neuromorphic constructs including, but not limited to, synapses based on CMOS circuitry. In other embodiments, the synapse may be a software-based synapse, a firmware-based synapse, or a combination software/firmware-based synapse that, in whole or in part, employs a software simulation or a firmware simulation of the neuro-biological characteristics of the biological synapse.

By definition herein, a 'synaptic time-multiplexed neuromorphic network' represents a complete or fully connected neuromorphic network as a sequence or series of decoupled sub-networks. Further, by definition herein, the decoupled sub-network provides a subset of connections of a set of connections that are present in the fully connected neuromorphic network. In some embodiments, each of the decoupled sub-networks provides a subset of the set of connections of the fully connected neuromorphic network. The decoupled sub-networks combine during time multiplexing to achieve the connectivity and functionality of the fully connected neuromorphic network. Further by definition herein, a 'synaptic time-multiplexed neuromorphic network' is a synaptic time-multiplexed neuromorphic network implemented using a neuromorphic network (i.e., an implementation comprising hardware-based circuits).

According to various embodiments, 'synaptic time multiplexing' divides or breaks down a fully connected neuromorphic network into a plurality of decoupled sub-networks, by definition herein. The plurality of decoupled sub-networks comprises all of a plurality of nodes that make up the fully connected neuromorphic network. A 'node' is defined as a combination of a neuron and one or more associated synapses. However, each of the decoupled sub-networks comprises only a subset of a set of connections between nodes represented by the fully connected neuromorphic network. 'Synaptic time multiplexing' further forms the fully connected neuromorphic network as a time series of the various decoupled sub-networks, by definition herein. In particular, synaptic time multiplexing forms the decoupled sub-networks in different time slots of a synaptic time multiplexing cycle. In some embodiments, each of the decoupled sub-networks is formed in a different time slot of the cycle. When the synaptic time multiplexing cycle is completed, all of the decoupled sub-networks have been formed. Moreover, when combined over a period of the synaptic time multiplexing cycle, the decoupled sub-networks and their respective subsets of connections produce the fully connected neuromorphic network, by definition herein.

FIG. 1A illustrates a schematic representation of synaptic time multiplexing, according to an embodiment consistent with the principles of the present invention. In particular, a right side of FIG. 1A illustrates a fully connected neuromorphic network 10 in terms of nodes 12 and a set of connections 14 between nodes. A left side of FIG. 1A illustrates three decoupled sub-networks 20, by way of example. A sub-network 20 comprises the nodes 12 of the fully connected neuromorphic network. Further, the sub-network 20 comprises a subset of the connections 24 in the fully connected neuromorphic network 10. For example, the respective subset of the connections 24 may be different for each sub-network 20. Combined, the connections 24 of the subsets equal the set of the connections 14 of the fully connected neuromorphic network 10 as indicated by an equal sign ('=') in FIG. 1A. Moreover, the subsets of the connections 24 illustrated in FIG. 1A may be executed or otherwise formed during separate time slots of a synaptic time multiplexing (STM) cycle (e.g., time slots 1, 2 and 3, as illustrated). When combined or summed together, the subsets of connections 24 formed during the separate time slots produce all of the connections 14 of the set in the fully connected neuromorphic network 10. As such, once every synaptic time multiplexing (STM) cycle, the fully connected neuromorphic network 10 may be realized by the sequential formation of the subsets of connections 24 represented by the decoupled sub-networks 20.

Figure 1B:
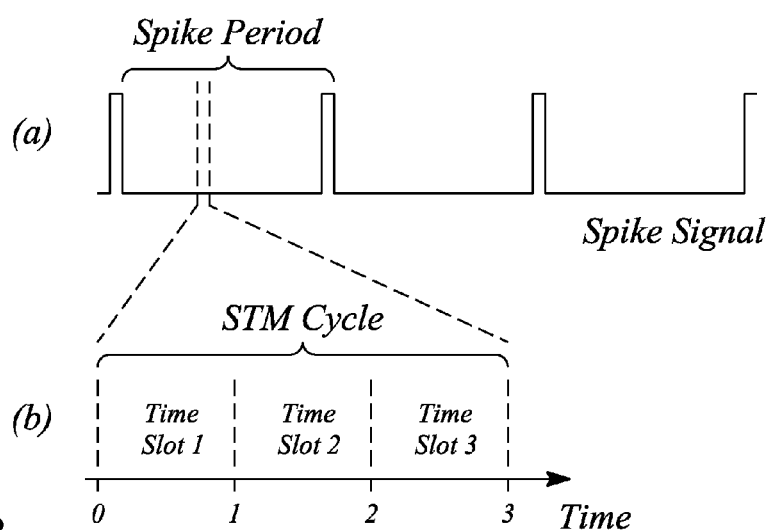
FIG. 1B illustrates a graphical representation of a synaptic time multiplexing cycle, according to an embodiment consistent with the principles of the present invention.

FIG. 1B illustrates a graphical representation of a synaptic time multiplexing cycle, according to an embodiment consistent with the principles of the present invention. Also illustrated is a plot of an example spike signal. In particular, an upper portion of FIG. 1B labeled (a) illustrates the spike signal having a spike period and a lower portion of FIG. 1B labeled (b) illustrates a synaptic time multiplexing (STM) cycle of the spike period. The synaptic time multiplexing cycle includes three time slots, as illustrated by way of example. The three time slots may be the time slots during which the decoupled sub-networks 20 of FIG. 1A are formed. For example, during a first time slot (e.g., time slot 1) of FIG. 1B, a first decoupled sub-network 20 (or e.g., connections 24 thereof) may be formed. Then, during a second time slot (e.g., time slot 2) and a third time slot (e.g., time slot 3) of FIG. 1B, a second decoupled sub-network 20 and third decoupled sub-network 20, respectively, (or e.g., respective connections 24 thereof) of FIG. 1A may be formed, for example. At an end of the synaptic time multiplexing cycle, all of decoupled sub-networks, and by extension all of the subsets of connections 24, have been formed such that all of the connections 14 of the fully connected neuromorphic network 10 in FIG. 1A have been formed. Further, the synaptic time multiplexing cycle ('STM cycle') is a fraction of the spike period of the spike signal, as illustrated in FIG. 1B. According to various examples, the synaptic time multiplexing cycle may be repeated in each spike period and is timed to be completed during a spike of the spike signal. Further discussion of synaptic time multiplexing is provided by Minkovich et al., "Programming Time-Multiplexed Reconfigurable Hardware Using a Scalable Neuromorphic Compiler," *IEEE Trans. on Neural Networks and Learning Systems*, Vol. 23, No. 6, June 2012, pp. 889-910, incorporated herein by reference in its entirety.

According to various embodiments, neuromorphic circuits, modules, and systems described herein may transmit signals within and among elements thereof as spike signals. Herein, a 'signal' is defined as a time varying quantity. Thus, a signal may be generally represented by a function of time t as S(t). However, in general herein, signals are represented without explicit reference to time for simplicity of notation and not by way of limitation. For example, the signal S(t) may be denoted or represented simply as 'S'. Herein, a 'spike signal', is also referred to as an action potential, and is defined herein as a signal that comprises two states as a function of time (t). According to some embodiments, a first state of the two states is referred to as a low or 'OFF' state and a second state of the two states is referred to as a high or 'ON' state. In various examples, the states may represent one or both of voltage values or levels and current values or levels. For example, the first state may be a first voltage (e.g., 0 millivolts (mV)) and the second state may be second voltage (e.g., 100 mV). Alternatively, the states may be represented by values of current such that the first state is a first current (e.g., 0 microamps ($\mu A$)) and the second state is a second current (e.g., 1000 $\mu A$). A spike signal in which the states are represented as voltage values may be referred as a 'voltage' spike signal. Similarly, a spike signal in which values of current represent the states may be referred to as a 'current' spike signal.

Further, a 'spike signal' is generally characterized by being in or exhibiting one of the two states (e.g., the first or OFF state) for a majority of the time t with only brief transitions to the other state (e.g., the second or ON state), by definition herein. For example, the spike signal may exhibit a sequence of spikes of the ON state that are separated by relatively longer periods or inter-spike intervals (i.e., relative to a length of the spike) in the OFF state. According to various examples, a ratio of a length in time of a spike or 'spike time' to a length in time of an inter-spike interval or 'inter-spike interval time' is generally much less than one. In some embodiments, the ratio may be less than about 0.2. For example, the ON state spike time may be about 0.1 s, while the OFF state inter-spike interval time between a pair of ON state spikes may be about 1 s or more.

According to various embodiments, the spikes of the spike signal may be either aperiodic or periodic. For example, an aperiodic spike signal may comprise a series of spikes that occur at substantially random times or having substantially random inter-spike intervals. On the other hand, the spike signal may be a periodic spike signal that exhibits spikes at regular and repeating points in time. For example, a periodic spike signal may have a spike every 10 ms. In another example, spikes may occur at intervals of about 50 ms in another periodic spike signal. Such periodic spike signals are often said to have or exhibit a duty cycle. Herein, 'duty cycle' is defined in the usual sense as a ratio of a length of a spike to a time interval between spikes in a periodic spike signal.

Further, a periodic spike signal may be piece-wise or quasi-periodic, as used herein. In particular, the periodic spike signal may be periodic for only a finite and relatively short period of time. For example, the periodic spike signal may comprise a sequence of five or ten spikes in a periodic sequence or 'burst'. In another example, a periodic spike signal may comprise a finite sequence of periodic spikes (e.g., 5 spikes) followed by a relatively long interval of no spikes that may be further followed by another finite sequence of periodic spikes. The other finite sequence of periodic spikes may have the same number (e.g., 5) or a different number (e.g., 1, 2, 3, 4, 6, 7, 8, . . . ) of spikes, for example. In other embodiments, a duty cycle or equivalently an inter-spike interval of spikes of a periodic spike signal may vary as a function of time.

In some embodiments, spikes of a spike signal (either aperiodic or periodic) may occur asynchronously. By 'asynchronously' it is meant by definition that timing of a spike in the spike signal is not determined or otherwise tied to a particular clock signal. In particular, spikes of a pair of spike signals may be asynchronous with respect to one another. Timing of the spikes in the pair of asynchronous spike signals is or may be substantially uncorrelated between the pair. As such, spikes of a first spike signal of the pair may occur at any time relative to spikes of a second spike signal of the pair since the pair of spike signals are not tied to or otherwise regulated by a master clock signal.

Embodiments consistent with the principles described herein may be implemented using a variety of devices and circuits including, but not limited to, integrated circuits (ICs), very large scale integrated (VLSI) circuits, application specific integrated circuits (ASIC), field programmable gate arrays (FPGAs) and the like, firmware, software, and a combination of two or more of the above. For example, elements or 'blocks' of an apparatus consistent with the principles described herein may all be implemented as circuit elements within an ASIC or a VLSI circuit. Implementations that employ an ASIC or a VLSI circuit are examples of hardware-based circuit implementation, for example. In another example, the embodiments of the present invention may be implemented as software using a computer programming language (e.g., C/C++) or software-based modeling environment (e.g., Matlab®, MathWorks, Inc., Natick, Mass.). Implementation that employs only software is an example of a purely software implementation. In yet another example, some of the blocks or portions may be implemented using actual circuitry (e.g., as an IC or an ASIC) while other blocks or portions may be implemented in software or firmware.

Herein, a 'non-transitory computer readable medium' is defined as substantially any data storage medium that provides non-transitory storage of information that may be read or otherwise utilized by a computer. For example, computer readable memory including, but not limited to, random access memory (RAM), read-only memory (ROM), programmable or erasable ROM and flash memory (e.g., a thumb drive) are all non-transitory computer readable medium, by definition herein. Other examples of non-transitory computer readable medium include, but are not limited to, various types of magnetic disks and disk drives (e.g., a hard disk drive, a floppy disk drive, a floppy diskette, etc.) along with various optical discs and disc drives (e.g., CD, CD-R, CD-RW, DVD, etc.), by definition herein. In addition, network attached storage, so-called 'cloud' storage (e.g., remote data storage accessible via the Internet), and various other types of computer readable medium used by modern computing systems may be non-transitory computer readable medium, by definition herein.

Further, as used herein, the article 'a' is intended to have its ordinary meaning in the patent arts, namely 'one or more'. For example, 'a neuron' means one or more neurons and as such, 'the neuron' means 'the neuron(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or in some examples, means plus or minus 20%, or plus or minus 10%, or plus or minus 5%, or plus or minus 1%, unless otherwise expressly specified. Moreover, examples and embodiments herein are intended to be illustrative only and are presented for discussion purposes and not by way of limitation.

Figure 2:
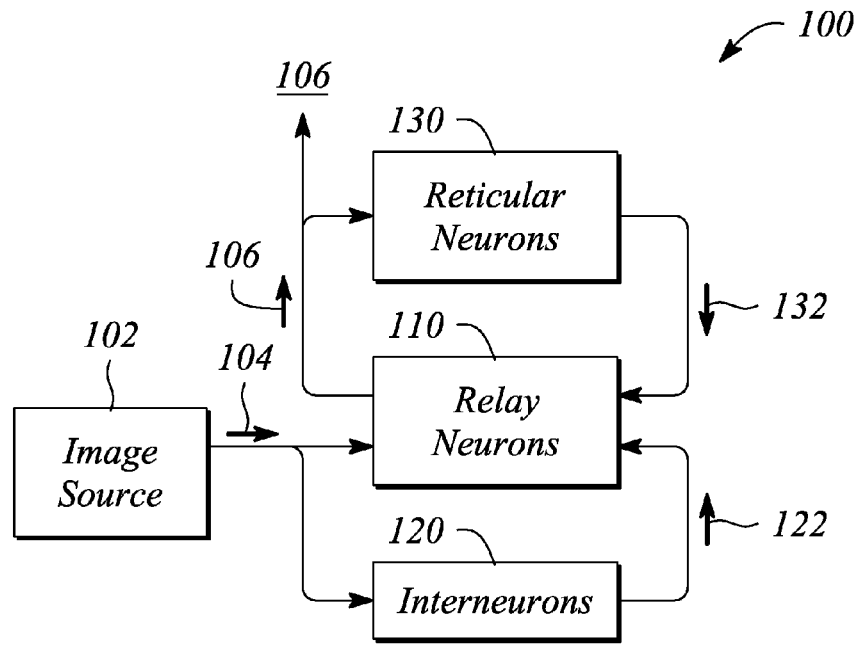
FIG. 2 illustrates a block diagram of a neuromorphic image processing channel, according to an embodiment consistent with the principles of the present invention.

FIG. 2 illustrates a block diagram of a neuromorphic image processing channel 100, according to an embodiment consistent with the principles of the present invention. In particular, the neuromorphic image processing channel 100 may exhibit thalamus-like properties, according to some embodiments. As illustrated, the neuromorphic image processing channel 100 is configured to process data and more particularly image data. According to various embodiments, image data may be provided to the neuromorphic image processing channel 100 (e.g., that exhibits thalamus-like properties) by an image source 102 such as, but not limited to, an image file and an image sensor or sensor array. In other embodiments, the neuromorphic image processing channel 100 may be configured to process data other than image data (e.g., multichannel audio data, multispectral radio frequency or microwave data, etc.). However, for simplicity of discussion, herein 'image data' will be employed by way of example and not limitation to represent all data that may be processed by the neuromorphic image processing channel 100 in accordance with the principles herein.

In some examples, the image data may be provided by the image source 102 that is configured to simulate a retina (e.g., a biological retina). The image source 102 may be a neuromorphic retina, for example. The retina may encode as image data an image that is focused onto the retina. The image data encoded by the retina may represent the image as a two-dimensional (2-D) array of pixels with a separate output from the retina associated with each pixel, for example. In other examples, the image source 102 may include, but is not limited to, a capacitive coupled (CCD) image sensor or array and a complimentary metal-oxide semiconductor (CMOS) image sensor or array configured as an array of pixels. The array of pixels may be a focal plane array, for example. As such, the pixels may represent the outputs of individual image sensors or cells (e.g., rods and/or cones of a neuromorphic retina, cells in a CCD or CMOS image sensor, etc.), for example. In yet other examples, the image source 102 may include an image file stored in memory such as, but not limited to a TIFF image; and the pixels may be pixels of the image file.

In various embodiments, the image source 102 provides the image data in the form of spiking signals. In particular, pixels in the image data of the image source 102 may be represented by a spiking signal that, in turn, is provided by the image source 102. In some embodiments, a particular spiking signal may represent or correspond to an individual, single pixel of the image source image data, while in other embodiments, the particular spiking signal may correspond to a group or set of the pixels. As such, the image data provided by the image source 102 is referred to herein as a plurality of spiking input signals 104 received by the neuromorphic image processing channel 100 from the image source 102. Further, the spiking input signals 104 may be divided into sets or groups of spiking input signals 104 for use by various elements and portions of the neuromorphic image processing channel 100, according to various embodiments and as described in more details below.

As illustrated in FIG. 2, the neuromorphic image processing channel 100 comprises a plurality of relay neurons 110. According to various embodiments, the plurality of relay neurons 110 may be arranged or organized in a manner consistent with the image data being processed by the neuromorphic image processing channel 100. For example, the plurality of relay neurons 110 may be arranged in parallel to one another as or representative of a 2-D array or grid of relay neurons 110. The 2-D array or grid may correspond to a 2-D array of pixels in the image data, for example. For example, the plurality of relay neurons 110 may include a sixty-four by sixty-four (64×64) 2-D array of relay neurons 110.

According to various embodiments, the plurality of relay neurons 110 are configured to receive spiking input signals 104, e.g., from the image source 102. In turn, the relay neurons 110 produce spiking output signals 106. In general, characteristics of the spiking output signals 106 produced by individual relay neurons 110 of the relay neuron plurality are a function of both the spiking input signals 104 and any feed-forward and feedback inhibition received by relay neurons 110 or the relay neuron plurality, as described below in more detail. The output spiking signals 106 may be provided to and used by other imaging processing operations, modules, etc. (not illustrated) as an output of the neuromorphic image processing channel 100, according to some embodiments.

For example, a particular relay neuron 110 may receive a particular spiking input signal 104. In turn, the particular relay neuron 110 produces a spiking output signal 106 from and according to the specific spiking input signal 104. Further, characteristics of the spiking output signal 106 produced by the particular relay neuron 110 may be modified, modulated, or otherwise influenced according to one or both of feed-forward inhibition and feedback inhibition applied to or received by the particular relay neuron 110.

In some embodiments, a relay neuron 110 may be configured to receive a spiking input signal 104 according to a one-to-one mapping. The one-to-one mapping may describe a relationship between the individual, pixel-differentiated, spiking input signals 104 and the individual relay neurons 110 of the relay neuron plurality and therefore, may be referred to as a 'spiking input signal mapping'. In particular, each of several spiking input signals 104 may be provided to a different one of the relay neurons 110 by the spiking input signal mapping, according to some embodiments. For example, a quantity or number of spiking input signals 104 may equal a quantity or number of relay neurons 110 in the relay neuron plurality. The one-to-one mapping is a spiking input signal mapping that dictates how each of the relay neurons 110 is connected to receive a corresponding spiking input signal 104 from the image source 102. In some examples, the spiking input signals 104 correspond to a 2-D array of pixels in the image data of the image source 102. According to the one-to-one mapping, individual relay neurons 110 of the relay neuron plurality may similarly correspond to particular, individual pixels of the 2-D array of pixels, for example.

Figure 3A:
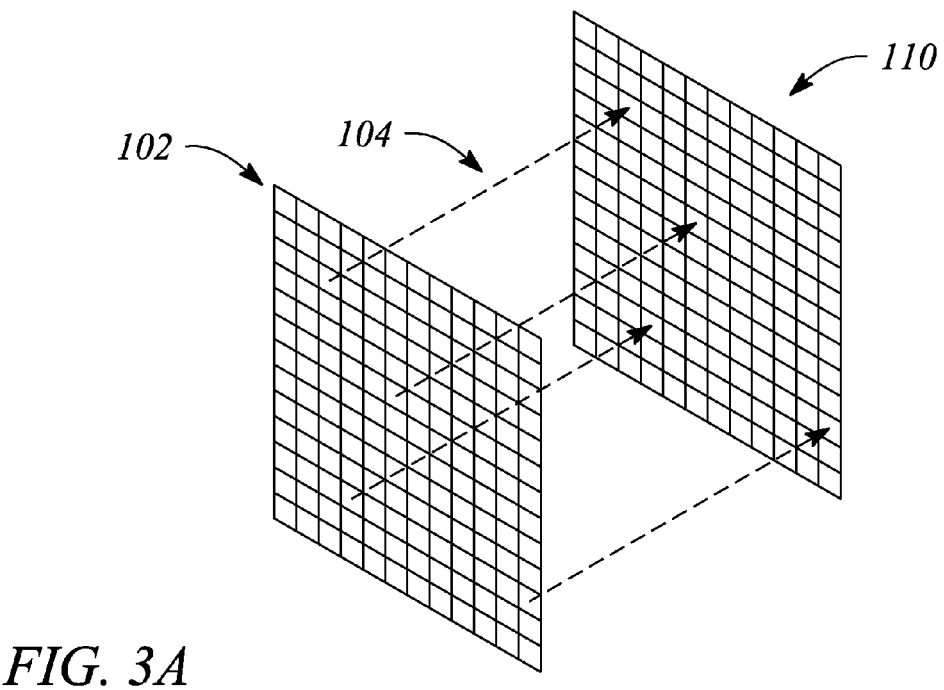
FIG. 3A illustrates a schematic perspective view of a spiking input signal mapping between an image source and a plurality of relay neurons, according to an embodiment consistent with the principles of the present invention.

FIG. 3A illustrates a schematic perspective view of a spiking input signal mapping between an image source 102 and a plurality of relay neurons 110, according to an embodiment consistent with the principles of the present invention. In particular, FIG. 3A illustrates image data of the image source 102 as a 2-D array of squares (i.e., a grid), where each square represents a pixel of the image data. Each individual pixel may also correspond to a separate spiking input signal 104 produced by the image source 102, according to some embodiments. Also illustrated in FIG. 3A is a 2-D array of squares representing relay neurons 110 of the relay neuron plurality.

A one-to-one mapping of pixels or equivalently spiking input signals 104 to relay neurons 110 is illustrated in FIG. 3A by a plurality of arrows labeled 104. The arrows 104 connect between squares of the 2-D array of pixels in the image data and squares of the 2-D array of relay neurons 110 of the relay neuron plurality. The arrows may represent the spiking input signals 104 in the one-to-one mapping, for example. As illustrated, each arrow 104 identifies a relay neuron 110 that corresponds to a particular pixel or equivalently to a particular spiking input signal 104 by the connection provided by the arrow 104. The connections illustrated in FIG. 3A are provided by way of example and not limitation.

In other embodiments, the relay neurons 110 of the relay neuron plurality are configured to receive spiking input signals 104 according to a one-to-many mapping. In particular, a set of the relay neurons 110 of the relay neuron plurality corresponding to a spiking input signal 104 may be configured to receive the spiking input signal 104 according to a one-to-many mapping. In some examples, the one-to-many mapping may be a mapping of the spiking input signal 104 into a region of the plurality of relay neurons 110 corresponding to the spiking input signal 104. The region may define the set of relay neurons 110, according to some embodiments. For example, the spiking input signal 104 may represent a particular pixel in the image data. The spiking input signal 104 may be applied to the set of relay neurons 110 according to a predefined pattern or distribution. For example, the predefined pattern or distribution may be centered around a relay neuron 110 corresponding to the particular pixel.

In some examples, the predefined pattern may be a probabilistic pattern, while in other examples the predefined pattern may be a deterministic pattern. In particular, the one-to-many mapping may conform to a 2-D Gaussian pattern within the corresponding set of the relay neurons 110. According to the 2-D Gaussian pattern, a probability that a given relay neuron 110 of the relay neuron set is connected to receive the spiking input signal 104 (i.e., connection probability) is determined by a 2-D Gaussian probability distribution characterized by a mean μ and a standard deviation σ, by definition herein. The 2-D Gaussian pattern may be centered on a region defined by the relay neuron set, for example. In some examples, the 2-D Gaussian pattern may have a radius between one and several neurons (e.g., 4 or more) of the relay neurons 110. In some examples, the mean μ of the 2-D Gaussian probability distribution may be about one (i.e., μ=1) and the standard deviation σ may be about one (i.e., σ=1).

Other probability distributions such as, but not limited to, a Laplace distribution also may be employed instead of the 2-D Gaussian probability distribution to provide a probabilistic pattern, in some examples. In yet other embodiments, the one-to-many mapping may conform to a deterministic pattern controlled by a deterministic or regular distribution. For example, every other relay neuron 110 of the relay neuron set may be connected to receive the spiking input signal 104. In other examples, the deterministic pattern may include, but is not limited to, relay neuron set connections to provide the spiking input signal 104 to every third relay neuron 110, every fourth relay neuron, or according to other similar deterministic patterns.

Figure 3B:
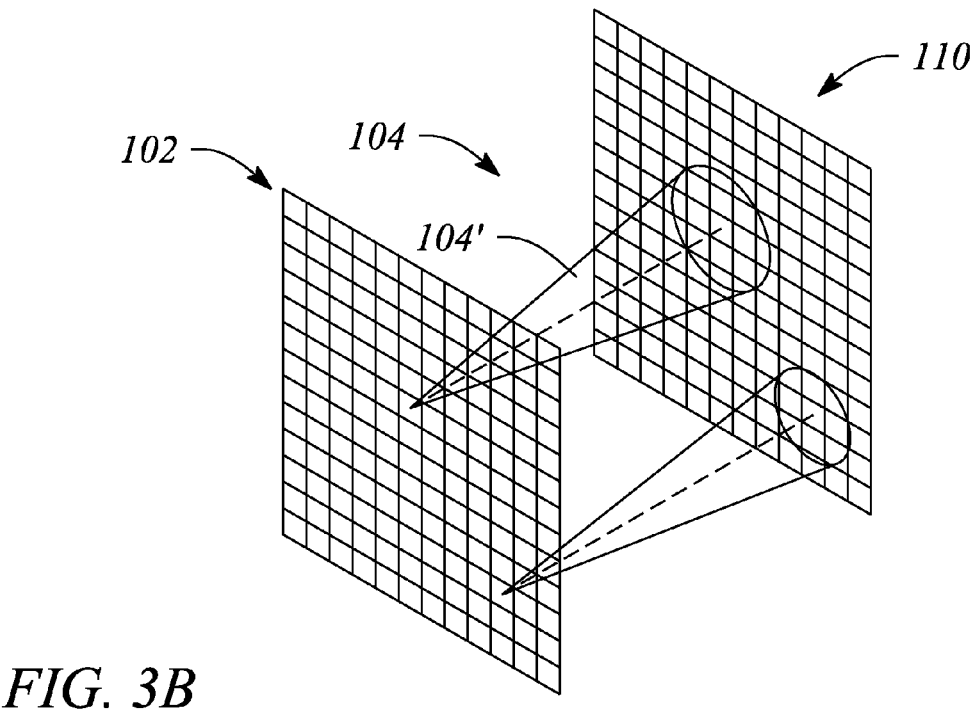
FIG. 3B illustrates a schematic perspective view of a spiking input signal mapping between an image source and a plurality of relay neurons, according to another embodiment consistent with the principles of the present invention.

FIG. 3B illustrates a schematic perspective view of a spiking input signal mapping between an image source 102 and a plurality of relay neurons 110, according to another embodiment consistent with the principles of the present invention. In particular, FIG. 3B illustrates a one-to-many mapping between the image source 102 and the plurality of relay neurons 110. The one-to-many mapping is illustrated as a cone 104' extending between the image source 102 and the plurality of relay neurons 110, as illustrated in FIG. 3B. In particular, FIG. 3B illustrates a set of relay neurons 110 configured to receive the spiking input signal 104 according to a one-to-many mapping depicted as the cone 104'. The spiking input signal 104 originates from a pixel of the image source 102 at an apex of the cone 104' and is connected according to the one-to-many mapping to relay neurons 110 of the relay neuron set encompassed by a base of the cone 104', as illustrated. Further as illustrated, a central axis of the cone 104' depicted by a dashed line provides an example of a correspondence between the spiking input signal 104 and the set of relay neurons 110. The relay neuron set illustrated in FIG. 3B is located in a region of the plurality of neurons 110 delineated by the base of the cone 104' and centered on the cone central axis. A distribution of connections of the relay neuron set allowing individual relay neurons 110 to receive the spiking input signal 104 is not illustrated in FIG. 3B for simplicity of illustration.

Figure 4:
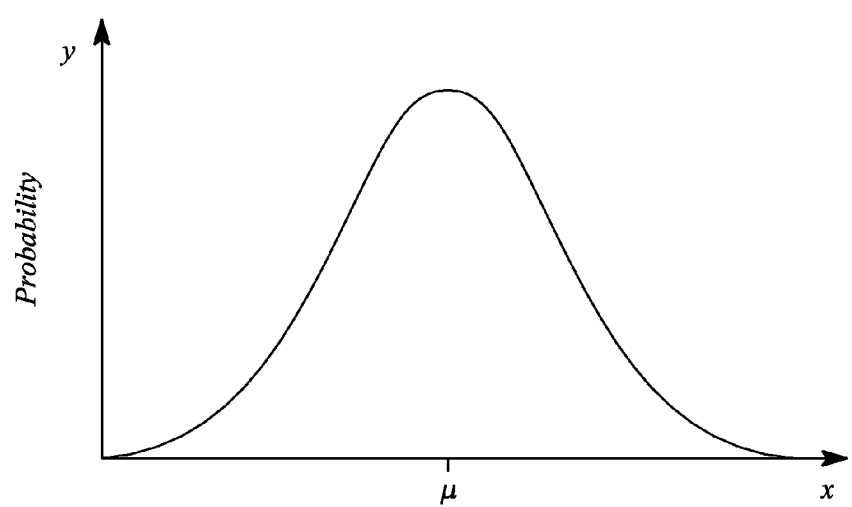
FIG. 4 illustrates a graphical representation of a cross section through a 2-D Gaussian pattern, according to an embodiment consistent with the principles of the present invention.

FIG. 4 illustrates a graphical representation of a cross section through a 2-D Gaussian pattern, according to an embodiment consistent with the principles of the present invention. In particular, FIG. 4 depicts a curve representing the 2-D Gaussian pattern along a cross section centered on the set of relay neurons (e.g., centered on a cone base), for example, as illustrated in FIG. 3B. A height of or area under the curve (y-axis) in illustrates a probability that a relay neuron distributed along the x-axis is connected to receive a spiking input signal according to the one-to-many mapping. The higher the curve, the more likely the relay neuron in the cross section is to receive the spiking input signal. This one-to-many mapping is not limited to spiking input to relay neurons (e.g., interneurons to relay neurons).

Referring again to FIG. 2, the neuromorphic image processing channel 100 further comprises a plurality of interneurons 120. Interneurons 120 of the interneuron plurality may be a plurality of neurons arranged in parallel to one another (e.g., in a 2-D array or grid of interneurons). The plurality of interneurons 120 is configured to receive the spiking input signals (e.g., from the image source 120). The plurality of interneurons 120 is further configured to provide feed-forward inhibition to relay neurons 110 of the relay neuron plurality, according to various embodiments. For example, the plurality of interneurons 120 may include a sixteen by sixteen (16×16) 2-D array of interneurons 120. Feed-forward inhibition may be provided as a feed-forward inhibition signal 122, for example, as illustrated in FIG. 2.

In particular, an interneuron 120 of the interneuron plurality may be configured to receive a spiking input signal 104 from the image source 102 and generate an output signal 122 (e.g., a spiking output signal). The generated output signal 122, in turn, may be applied to a relay neuron 110 to inhibit the firing of the relay neuron 110 and thus to provide the feed-forward inhibition, according to various embodiments. For example, the generated output signal 122 may be applied to the relay neuron 110 at an inhibit input of the relay neuron 110. As such, the generated output signal 122 may be referred to as an 'inhibition signal' 122 that provides the feed-forward inhibition to the relay neuron 110.

According to some embodiments, the interneuron 120 of the interneuron plurality is configured to receive a set of spiking input signals 104 according to a many-to-one mapping of the spiking input signals 104 of the set of spiking input signals into the interneuron 120. In particular, the set of spiking input signals 104, for example corresponding to different pixels in the image data of the image source 102, may be mapped or combined as an input to a single interneuron 120, according to some embodiments. While not illustrated, the many-to-one mapping may be depicted as a cone similar to the cone 104' illustrated in FIG. 3B. However, in the many-to-one mapping the cone base would be at the image source 102 and the cone apex would be at the interneuron 120 of the interneuron plurality.

In some embodiments, the many-to-one mapping may conform to a 2-D Gaussian pattern. In some example, the 2-D Gaussian pattern may have a radius that includes between one and several pixels or equivalently includes between one and several (e.g., 4 or more) spiking input signals 104. In some examples, the mean μ of the 2-D Gaussian probability distribution associated with the 2-D Gaussian pattern may be about one (i.e., μ=1) and the standard deviation σ may be about one-third (i.e., σ=0.33).

In some embodiments, an interneuron 120 of the interneuron plurality may be connected to a set of relay neurons 110 of the relay neuron plurality that correspond to the interneuron 120. The connection of the interneuron 120 to the corresponding set of relay neurons 110 may be according to a one-to-many mapping to provide the feed-forward inhibition. For example, an output of the interneuron 120 may be connected to multiple relay neurons 110 in the relay neuron set. The connection may provide an inhibition signal to the multiple relay neurons 110 that inhibits the firing by those relay neurons 110. The inhibition signal therefore acts as or provides feed-forward inhibition of relay neurons 110 of the relay neuron set, according to various examples. While not illustrated, the one-to-many mapping of the interneuron 120 into the corresponding relay neuron set may be depicted as a cone similar to the cone illustrated in FIG. 3B, but with the apex of the cone located at the interneuron 120 (e.g., instead of the image source 102, as illustrated in FIG. 3B).

In some embodiments, the one-to-many mapping of the interneuron 120 may conform to a 2-D Gaussian pattern within the corresponding set of the relay neurons 110. The 2-D Gaussian pattern may be substantially similar to the 2-D Gaussian pattern described above with respect to the one-to-many mapping of the spiking input signals 104 into the plurality of relay neurons 110, in some examples. For example, the cross section illustrated in FIG. 4 may also illustrate the probability distribution associated with the one-to-many mapping with respect to the interneuron 120. In some examples, the 2-D Gaussian pattern may have a radius that includes between one and several (e.g., a 4×4 set or more) relay neurons 110. In some examples, the mean μ of the 2-D Gaussian probability distribution associated with the 2-D Gaussian pattern of the one-to-many mapping of the interneuron 120 into the corresponding set of the relay neurons 110 may be about one (i.e., μ=1) and the standard deviation σ may be about one (i.e., σ=1).

In other embodiments, another probabilistic pattern (e.g., Laplace distribution) or even a deterministic pattern may be employed instead of the 2-D Gaussian pattern with respect to the one-to-many mapping associated with the interneuron 120. For example, the deterministic patterns described above with respect to the one-to-many mapping of the spiking input signal 104 into the relay neuron plurality may be employed here for the one-to-many mapping involving the interneuron 120.

The neuromorphic image processing channel 100 illustrated in FIG. 2 further comprises a plurality of reticular neurons 130. The plurality of reticular neurons 130 is configured to receive output spiking signals 106 from relay neurons 110 of the relay neuron plurality. The reticular neuron plurality is further configured to provide feedback inhibition to the relay neurons 110. For example, the plurality of reticular neurons 130 may include a sixteen by sixteen (16×16) 2-D array of reticular neurons 120. Feedback inhibition may be provided as a feedback inhibition signal 132, for example.

In some embodiments, a set of the relay neurons 110 of the relay neuron plurality is connected to a corresponding reticular neuron 130 of the reticular neuron plurality according to a many-to-one mapping. The many-to-one mapping is configured to provide the output spiking signals 106 from the set of relay neurons 110 to the corresponding reticular neuron 130, according to various embodiments. Further, in some embodiments, a reticular neuron 130 of the reticular neuron plurality is connected to a corresponding set of the relay neurons 110 of the relay neuron plurality according to a one-to-many mapping. The one-to-many mapping is configured to provide the feedback inhibition to the set of the relay neurons 110.

In some embodiments, the many-to-one mapping of the set of relay neurons 110 into corresponding reticular neuron 130 conforms to a 2-D Gaussian pattern within the relay neuron set. In some embodiments, the one-to-many mapping of the reticular neuron 130 into a corresponding set of relay neurons 110 conforms to a 2-D Gaussian pattern within the corresponding set of the relay neurons 110. The 2-D Gaussian pattern may be substantially similar to the 2-D Gaussian pattern described above with respect to the one-to-many mapping of the spiking input signals 104 into the plurality of relay neurons 110, in some examples. For example, the cross section illustrated in FIG. 4 may illustrate the probability distribution associated with either of the many-to-one mapping or the one-to-many mapping associated with the reticular neuron-to-relay neurons connections. The mean µ of the 2-D Gaussian probability distribution associated with the 2-D Gaussian pattern may be about one (i.e., µ=1), the standard deviation σ may be about one-third (i.e., σ=0.33), and the 2-D Gaussian pattern may have a radius that includes several relay neurons 110 of the set (e.g., 2 or more), for example.

As with other one-to-many mappings and many-to-one mappings described above, other patterns or distributions such as, but not limited to a Laplace pattern or distribution may be employed in the reticular neuron mapping. Similarly, for example, one or both of the many-to-one mapping and the one-to-many mapping may include a deterministic pattern or distribution (e.g., instead of the 2-D Gaussian pattern). In particular, the deterministic patterns described above with respect to the one-to-many mapping of the spiking input signal 104 into the relay neuron plurality may be employed here for either or both of the one-to-many mapping and the many-to-one mapping involving the reticular neurons 130, according to various embodiments.

In addition, a connection weighting or equivalently a connection strength of the connections between neurons within the various one-to-many mappings and many-to-one mappings may differ one or both of across connections associated with the mapping and from one mapping instance to another, according to various embodiments. In particular, for a given mapping (e.g., interneuron-to-relay neuron, relay neuron-to-reticular neuron, reticular neuron-to-relay neuron, etc.), the connection strength of neuron connections may vary across a region or set of the neurons encompassed by the mapping (e.g., from a center to an edge of the mapping-encompassed region). For example, the connection strength of connections in one or more of the interneuron-to-relay neuron mapping, the relay neuron-to-reticular neuron mapping, and the reticular neuron-to-relay neuron mapping may vary according to a 2-D Gaussian pattern across the set of encompassed neurons (i.e., the corresponding set of neurons). Similarly, connection strengths may vary across the set of neurons (e.g., relay neurons or interneurons) configured to receive the input spiking signals 104 according to the one or both of the one-to-many mapping and the many-to-one mapping described above.

Further, connection strengths of connections associated with a first mapping may differ from connection strengths of connections associated with a second mapping, according to various embodiments. In particular, connection strengths of connections in the relay neuron-to-reticular neuron mapping may differ from connection strengths of connections in the reticular neuron-to-relay neuron mapping, which may, in turn, differ from connections strengths of connections in the interneuron-to-relay neuron mapping, and so on, according to some embodiments. For example, the connection strength of connections in both an interneuron-to-relay neuron mapping and a reticular neuron-to-relay neuron mapping may conform to a 2-D Gaussian pattern with a mean µ of about 0.002 and a standard deviation σ of about 0.001. For the same example, connection strengths of a relay neuron-to-reticular neuron mapping may also conform to a 2-D Gaussian pattern, however the mean µ of the 2-D Gaussian pattern may be about 0.0625 and the standard deviation σ may be about 0.001, for example. Similarly, the connection strengths of connections that provide input spiking signals 104 to the relay neurons may vary across a set of the relay neurons according to a 2-D Gaussian pattern with a mean µ of about 0.25 and a standard deviation σ of about 0.001, while a 2-D Gaussian pattern for the mapping of the input spiking signals 104 into the interneurons may have a mean µ of about one (1.0) and a standard deviation σ of about 0.001, for example. Hence, one or both of the connection probability and connection strength within corresponding sets of neurons associated with various mappings may have a 2-D Gaussian pattern and further may differ from the connection probabilities and connection strengths of other mappings, according to various embodiments.

According to various embodiments, the relay neurons 110, the interneurons 120 and the reticular neurons 130 of the respective pluralities comprise neuromorphic neurons. For example, one or more individual neurons of each of the relay neuron plurality, the interneuron plurality and the reticular neuron plurality may be a neuromorphic neuron, according to some embodiments. As describe above, a neuromorphic neuron may be implemented using a number of different neuron models including, but not limited to, a Hodgkin-Huxley neuron and an Izhikevich neuron.

In particular, in some embodiments, a relay neuron 110 of the relay neuron plurality may be an Izhikevich neuromorphic neuron. The Izhikevich neuromorphic neuron may be a four-parameter Izhikevich neuromorphic neuron or model thereof, for example. According to various embodiments, the Izhikevich neuromorphic neuron of the relay neurons 110 may be configured to provide both tonic firing patterns and burst firing patterns with the burst firing patterns to occur after hyperpolarization (i.e., a post-hyperpolarization burst firing pattern). In some examples, the Izhikevich neuromorphic neuron may be fitted or adapted (e.g., by optimization) to adjust parameters thereof and produce the tonic and burst firing patterns described above. The tonic and burst firing patterns with the post-hyperpolarization burst firing pattern to which the Izhikevich neuromorphic relay neuron is fitted may represent or simulate characteristics of a biological thalamocortical relay neuron, according to some embodiments.

In some embodiments, an interneuron 120 of the interneuron plurality may be an Izhikevich neuromorphic neuron. The Izhikevich neuromorphic neuron may be a four-parameter Izhikevich neuromorphic neuron or model thereof, for example. According to various embodiments, the Izhikevich neuromorphic neuron of the interneurons 120 may be configured to provide rebound spiking after hyperpolarization with substantially no burst mode. In some examples, the Izhikevich neuromorphic neuron may be fitted or adapted (e.g., by optimization) to adjust parameters thereof and produce the post-hyperpolarization rebound spiking with little or no burst mode as described above. The post-hyperpolarization rebound spiking without burst mode to which the Izhikevich neuromorphic interneuron is fitted may represent or simulate characteristics of a biological thalamocortical interneuron, according to some embodiments.

In some embodiments, a reticular neuron 130 of the reticular neuron plurality may be an Izhikevich neuromorphic neuron. The Izhikevich neuromorphic neuron may be a four-parameter Izhikevich neuromorphic neuron or model thereof, for example. According to various embodiments, the Izhikevich neuromorphic neuron of the reticular neurons 130 may be configured to provide both tonic firing patterns and burst firing patterns. Further, a firing rate of the reticular neuron 130 may be less than a firing rate of the relay neurons 110 of the relay neuron plurality, according to some embodiments. In some examples, the Izhikevich neuromorphic neuron may be fitted or adapted (e.g., by optimization) to adjust parameters thereof and produce the tonic and burst firing patterns described above. The tonic and burst firing patterns with the firing rate less than that of the relay neurons 110 to which the Izhikevich neuromorphic reticular neuron is fitted may represent or simulate characteristics of a biological thalamocortical reticular neuron, according to some embodiments.

According to various embodiments, a quantity of the relay neurons 110 of the relay neuron plurality exceeds each of a quantity of the interneurons 120 of the interneuron plurality and a quantity of the reticular neurons 130 of the reticular neuron plurality. In particular, the quantity of the interneurons 120 in the interneuron plurality may be about twenty percent (20%) of a sum of the quantity of the relay neurons 110 in the relay neuron plurality plus the quantity of the interneurons, in some embodiments. Further, in some embodiments, the quantity of the reticular neurons 130 in the reticular neuron plurality may be about equal to the quantity of the interneurons 120 in the interneuron plurality. For example, there may be about sixteen (16) of each of the interneurons 120 and the reticular neurons 130 and about sixty-four (64) relay neurons 110. In the example with 64 relay neurons 110, there may be about 64 spiking input signals 104 as well as about 64 pixels in the image data of the image source 102, for example.

Figure 5:
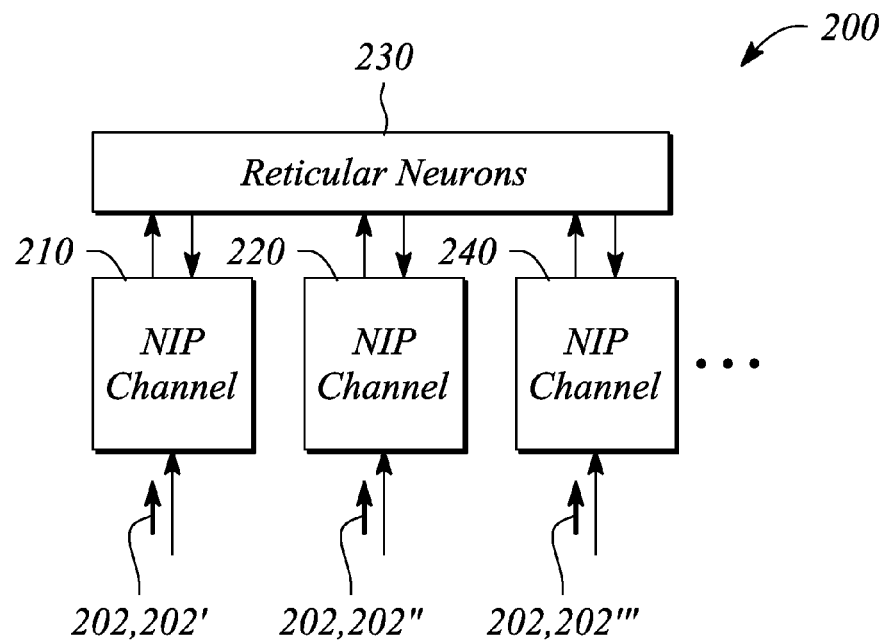
FIG. 5 illustrates a block diagram of a neuromorphic image processing system, according to an embodiment consistent with the principles of the present invention.

According to various embodiments of the present invention, a neuromorphic image processing system is provided. In particular, the neuromorphic image processing system may exhibit thalamus-like properties, according to some embodiments. FIG. 5 illustrates a block diagram of a neuromorphic image processing system 200, according to an embodiment consistent with the principles of the present invention. The neuromorphic image processing system 200 is configured to process spiking input signals 202, according to various embodiments. As illustrated, the neuromorphic image processing system 200 comprises a first neuromorphic image processing (NIP) channel 210. The first NIP channel 210 comprises first relay neurons and first interneurons to receive a first set 202' of the spiking input signals 202. The first set of spiking input signals 202' may be spiking signals generated by an image source (not illustrated), for example. According to various embodiments, the first NIP channel interneurons are configured to provide feed-forward inhibition to the first NIP channel relay neurons.

The neuromorphic image processing system 200 illustrated in FIG. 5 further comprises a second neuromorphic image processing (NIP) channel 220. The second NIP channel 220 comprises second relay neurons and second interneurons to receive a second set 202" of spiking input signals 202 (e.g., from an image source). According to various embodiments, the second NIP channel interneurons are configured to provide feed-forward inhibition to the second NIP channel relay neurons.

In some embodiments, one or both of the first NIP channel 210 and the second NIP channel 220 are substantially similar to a portion of the neuromorphic image processing channel 100 that includes the relay neuron plurality and the interneuron plurality, as described above. For example, the first and second relay neurons and the first and second interneurons of the first and second NIP channels 210, 220, respectively, may be substantially similar to and interconnected as described with respect to the plurality of relay neurons 110 and the plurality of interneurons 120 described above with respect to the neuromorphic image processing channel 100.

In particular, in some embodiments, a spiking input signal may be configured to be received by both the first and second NIP channels 210, 220 according to a one-to-many mapping into a set of the relay neurons of the respective NIP channels corresponding to the spiking input signal. Further, in some embodiments, a first interneuron of the first NIP channel 210 may be connected to a set of first NIP channel relay neurons according to a one-to-many mapping to provide the feed-forward inhibition to the first NIP channel relay neuron set. In some embodiments, a second interneuron of the second NIP channel 220 may be connected to a set of second NIP channel relay neurons according to a one-to-many mapping to provide the feed-forward inhibition to the second NIP channel relay neuron set. In some embodiments, one or more of the one-to-many mappings may conform to a two-dimensional (2-D) Gaussian pattern within the corresponding sets of the respective NIP channels relay neurons. In other embodiments, another probabilistic pattern or a deterministic pattern may be employed.

As illustrated in FIG. 5, the neuromorphic image processing system 200 further comprises reticular neurons 230. The reticular neurons 230 are configured to receive output signals from both the first NIP channel relay neurons and the second NIP channel relay neurons. The reticular neurons 230 are further configured to provide feedback inhibition to the first NIP channel relay neurons and the second NIP channel relay neurons. In some embodiments, the reticular neurons 230 and the provided feedback inhibition are substantially similar to the reticular neurons 130 of the reticular neuron plurality and the feedback inhibition provided by the reticular neurons 130 described above with respect to the neuromorphic image processing channel 100.

In some embodiments, a quantity of the first NIP channel relay neurons exceeds each of a quantity of the first NIP channel interneurons and a quantity of the reticular neurons 230. In some embodiments, a quantity of the second NIP channel relay neurons exceeds each of a quantity of the second NIP channel interneurons and the quantity of the reticular neurons 230. For example, the quantity of the relay neurons in either of the first and second NIP channels 210, 220 may be about eighty percent (80%) of a sum of the quantity of the relay neurons plus the quantity of the interneurons in the respective NIP channels. Further, the quantity of the reticular neurons 230 may be about equal to the quantity of the respective interneurons in either the first NIP channel 210 or the second NIP channel 220, for example.

According to various embodiments, the first and second relay neurons and the first and second interneurons of the first and second NIP channels 210, 220, respectively, and the reticular neurons either are or comprise neuromorphic neurons. For example, a neuromorphic neuron of one or both of the first NIP channel 210 and the second NIP channel 220 may comprise an Izhikevich neuromorphic neuron such as, but not limited to, a four-parameter Izhikevich neuromorphic neuron or model thereof.

Further, the spiking input signals 202 may represent image data (e.g., from an image source), according to various examples. In some embodiments, the first set of spiking input signals 202' represent parvocellular spiking input signals and the second set of spiking input signals 202" represent magnocellular spiking input signals (e.g., from the image source). The parvocellular spiking input signals 202' may result in the relay neurons that receive these signals 202' being more sensitive to color (i.e., form) than temporal frequency (i.e., motion) than relay neurons that receive magnocellular spiking input signals 202", for example. Conversely, magnocellular spiking input signals 202" may result in the relay neurons that receive these signals 202" being more sensitive to temporal frequency (i.e., motion) than color (i.e., form). As such, the first NIP channel 210 that receives parvocellular spiking input signals 202' may be preferentially tuned to form (color) processing, while the magnocellular spiking input signals 202" received by the second NIP channel 220 may be preferentially tuned to temporal frequency (motion) processing.

The combination of the form-tuned first NIP channel 210 and the motion-tuned second NIP channel 220 may facilitate form and motion processing, according to some embodiments. For example, the first relay neurons of the first NIP channel 210 may be between one and two times (e.g., 1.8 times) more sensitive to changes in color than the second relay neurons of the second NIP channel 220. Conversely, the second relay neurons of the second NIP channel 220 may be about one to three times (e.g., 2.3 times) more sensitive to changes in temporal frequency (i.e., motion) than the first relay neurons of the first NIP channel 210, for example. This difference in sensitivity may facilitate color-preferential image processing by the first NIP channel 210 and motion-preferential image processing by the second NIP channel 220, according to some embodiments.

According to some embodiments (e.g., as illustrated in FIG. 5), the neuromorphic image processing system 200 further comprises a third NIP channel 240. The third NIP channel 240 comprises third relay neurons and third interneurons to receive a third set 202''' of spiking input signals 202 (e.g., from the image source). According to various embodiments, the third NIP channel interneurons are configured to provide feed-forward inhibition to the third NIP channel relay neurons. In some embodiments, the third NIP channel 240 is substantially similar to one or both of the first and second NIP channels 210, 220 described above. Further, the reticular neurons 230 of the neuromorphic image processing system 200 are configured to further receive output spiking signals from the third NIP channel relay neurons and to provide feedback inhibition to the third NIP channel relay neurons, according to various embodiments. According to some embodiments, the third set of spiking input signals 202''' are temporally delayed with respect to one or both of the first spiking input signal set 202' and the second spiking input signal set 202''. For example, the delay may be about 2 milliseconds (ms). In some embodiments, the first, second and third NIP channels may simulate three channels or layers of a lateral geniculate nucleus of biological thalamus. In some embodiments, the neuromorphic image processing system 200 may include additional NIP channel (e.g., as indicated by the ellipses).

In some embodiments, one or more of the first NIP channel 210, the second NIP channel 220, and the third NIP channel 240 may be implemented using a synaptic time-multiplexed (STM) neuromorphic network. In particular, an STM neuromorphic network comprising a neural fabric may be employed. Through time multiplexing, the STM neuromorphic network may provide a set of connections that is much denser (e.g., contains higher connectivity, greater synaptic densities, etc.) than is possible without time multiplexing, for example. A more detailed discussion of STM neuromorphic networks as well as specifics regarding operational characteristics of neural fabrics employed in STM neuromorphic networks is provided by Cruz-Albrecht et al., pending U.S. patent application Ser. No. 13/535,114 (filed Jun. 27, 2012), incorporated by reference herein in its entirety.

Figure 6:
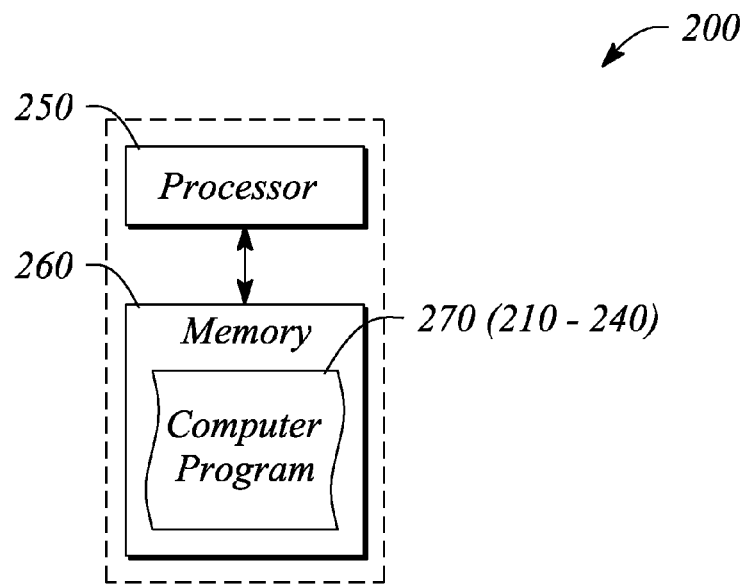
FIG. 6 illustrates a block diagram of a neuromorphic image processing system implemented using a computer, according to an embodiment consistent with the principles of the present invention.

In some embodiments, the neuromorphic image processing system 200 is implemented as computer program that, when executed by a general purpose computer, implements the neuromorphic image processing system 200. FIG. 6 illustrates a block diagram of a neuromorphic image processing system 200 implemented using a computer, according to an embodiment consistent with the principles of the present invention. As illustrated, the neuromorphic image processing system 200 further comprises a processor 250, a memory 260, and a computer program 270. The computer program 270 may be stored in the memory 260 and has instructions that, when executed by the processor 250, implement one or more of the first NIP channel 210, the second NIP channel 220, the reticular neurons 230, and the third NIP channel 240.

Figure 7:
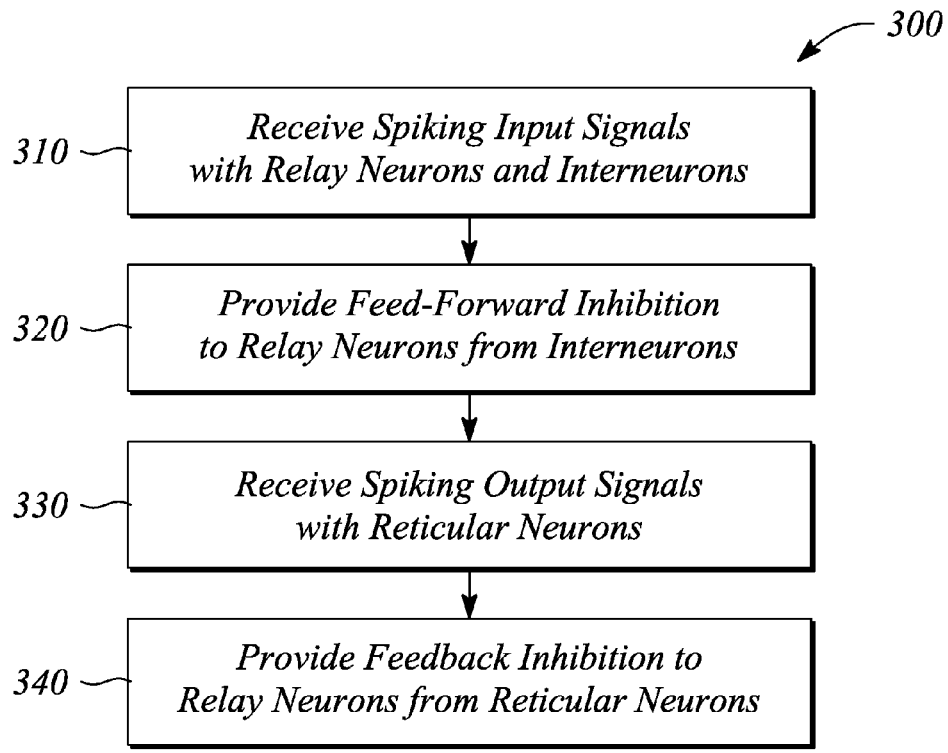
FIG. 7 illustrates a flow chart of a method of neuromorphic image processing, according to an embodiment consistent with the principles of the present invention.

According to various embodiments of the present invention, a method of neuromorphic image processing is provided. In some embodiments, the method of neuromorphic image processing provides image processing with thalamus-like functionality. FIG. 7 illustrates a flow chart of a method 300 of neuromorphic image processing, according to an embodiment consistent with the principles of the present invention. As illustrated therein, the method 300 of neuromorphic image processing comprises receiving 310 spiking input signals with a plurality of relay neurons and a plurality of interneurons. The spiking input signals may be provided by an image processing input source, for example. According to some embodiments, the plurality of relay neurons and the plurality of interneurons may be substantially similar to the plurality of relay neurons 110 and the plurality of interneurons 120, respectively, of the neuromorphic image processing channel 100, described above. Similarly, the spiking input signals may be substantially similar to the spiking signals 104 described above.

In particular, according to some embodiments, a spiking input signal may be received 310 by a set of relay neurons of the relay neuron plurality according to a one-to-many mapping. Moreover, an interneuron of the plurality of interneurons is configured to receive a set of the spiking input signals according to a many-to-one mapping of the set of spiking input signals. The one-to-many mapping conforms to a two-dimensional (2-D) Gaussian pattern within the corresponding set of the relay neurons, in some embodiments. Similarly, the many-to-one mapping associated with receiving 310 the set of spiking input signals with an interneuron may also conform to the 2-D Gaussian pattern. Other one-to-many mappings and many-to-one mappings described above also may be used in receiving 310 the spiking input signals.

The method 300 of neuromorphic image processing illustrated in FIG. 7 further comprises providing 320 feed-forward inhibition to the plurality of relay neurons from the plurality of interneurons. In some embodiments, the provided 320 feed-forward inhibition may be substantially similar to the feed-forward inhibition provided by the plurality of interneurons 130 of the neuromorphic image processing channel 100, described above. In particular, in some embodiments, providing 320 feed-forward inhibition to the relay neurons comprises a one-to-many mapping of an output of an interneuron of the interneuron plurality into a set of the relay neurons corresponding to the interneuron. In some embodiments, the one-to-many mapping conforms to a 2-D Gaussian pattern within the corresponding set of the relay neurons.

As illustrated in FIG. 7, the method 300 of neuromorphic image processing further comprises receiving 330 spiking output signals from the plurality of relay neurons with a plurality of reticular neurons. Further, the method 300 of neuromorphic image processing comprises providing 340 feedback inhibition to the plurality of relay neurons from the plurality of reticular neurons. In some embodiments, the reticular neurons of the reticular neuron plurality as well as the interconnection between the reticular neurons and the plurality of relay neurons are substantially similar to the reticular neurons 130 and the associated relay neuron 110 plurality connections described above with respect to the neuromorphic image processing channel 100.

In particular, in some embodiments, the spiking output signals from the plurality of relay neurons may be received 330 by the reticular neurons according to a many-to-one mapping. The many-to-one mapping may be substantially similar to the many-to-one mapping described above for the spiking output signals from the relay neurons received by the reticular neurons 130 of the neuromorphic image processing channel 100. Further, providing 340 feedback inhibition to the relay neurons may comprise a one-to-many mapping of an output of a reticular neuron of the reticular neuron plurality into a set of the relay neurons corresponding to the reticular neuron, according to some embodiments. In some embodiments, the one-to-many mapping conforms to a 2-D Gaussian pattern within the corresponding set of the relay neurons.

According to various embodiments of the method 300 of neuromorphic image processing, the relay neurons, the interneurons, and the reticular neurons of the respective pluralities comprise neuromorphic neurons. Further, a quantity of the relay neurons exceeds each of a quantity of interneurons and a quantity of reticular neurons, according to various embodiments of the method 300 of neuromorphic image processing.

In some embodiments of the method 300 of neuromorphic image processing, receiving 310 spiking input signals comprises receiving parvocellular spiking input signals and magnocellular spiking input signals. In some embodiments, the parvocellular spiking input signals are received 310 by a first neuromorphic image processing (NIP) channel comprising a first plurality of the relay neurons and a first plurality of the interneurons, and the magnocellular spiking input signals are received 310 by a second NIP channel comprising a second plurality of the relay neurons and a second plurality of the interneurons.

In some embodiments, receiving 310 spiking input signals further comprises receiving 310 spiking input signals by a third NIP channel comprising a third plurality of the relay neurons and a third plurality of the interneurons. The spiking input signals received 310 by the third channel may be temporally delayed with respect to one or both of the parvocellular spiking input signals and the magnocellular spiking input signals received 310 by the first NIP channel and the second NIP channel, respectively.

According to some embodiments of the principles described herein, a non-transistory computer readable medium is provided. The non-transistory computer readable medium includes instructions that, when executed by a processor, implement the method 300 of neuromorphic image processing. According to some embodiments, the non-transistory computer readable medium may include instructions that, when executed by a processor, implement one or both of the neuromorphic image processing channel 100 and the neuromorphic image processing system 200, described above. For example, the processor 250 illustrated in FIG. 6 may execute the computer program 270 contained in the non-transitory computer readable medium that is or is contained in the memory 260; or the computer described below with respect to FIG. 8 may be used.

Figure 8:
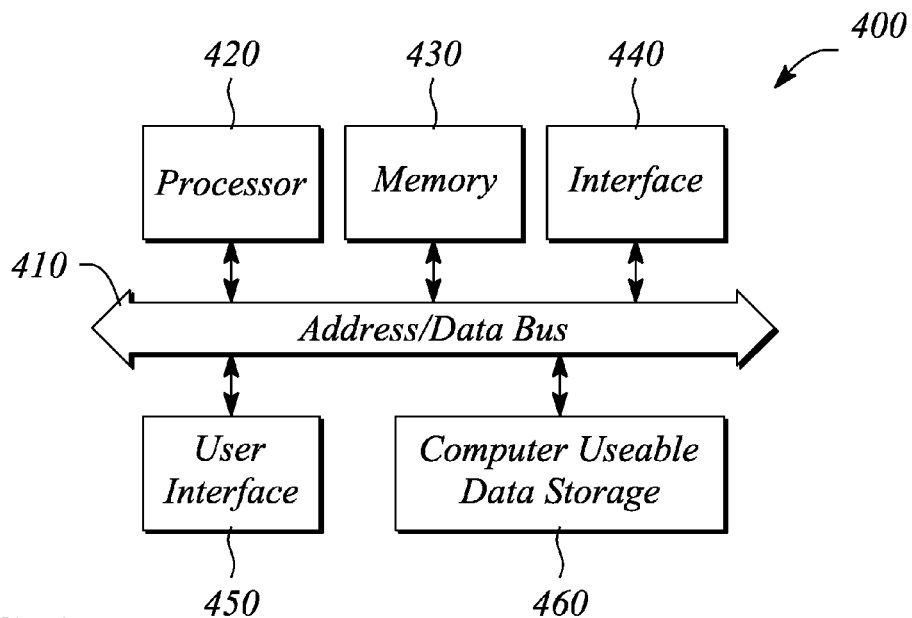
FIG. 8 illustrates a block diagram of a general-purpose computer, according to an embodiment consistent with the principles of the present invention.

FIG. 8 illustrates a block diagram of a general-purpose computer 400, according to an embodiment consistent with the principles of the present invention. The general-purpose computer 400 may be configured to implement (e.g., using a computer program) one or both of the neuromorphic image processing channel 100 and the neuromorphic image processing system 200, according to various embodiments. The general-purpose computer 400 may also be configured to implement the method 300 of neuromorphic image processing, in some embodiments.

As illustrated in FIG. 8, the general-purpose computer 400 comprises an address/data bus 410. The address/data bus 410 is configured to communicate information between and among various constituent elements and modules of the general-purpose computer 400. The general-purpose computer 400 further comprises a processor 420. The processor 420 is coupled to the address/data bus 410 and is configured to process information and instructions (e.g., perform computations according to computer program instructions). In some embodiments, the processor 420 is a microprocessor. In other embodiments, the processor 420 may include, but is not limited to a parallel processor, a virtual processor (e.g., cloud-based), an ASIC, an FPGA, etc.

According to various embodiments, the general-purpose computer 400 further comprises memory 430. In particular, the memory 430 may be implemented as one or more data storage units coupled to the address/data bus 410. The memory 430 is configured to store information and instructions for use by the processor 420, for example. According to various embodiments, the memory 430 and more particularly the data storage units of the memory 430 may include, but are not limited to, random access memory (RAM), static RAM (SRAM), and dynamic RAM (DRAM) that is coupled to the address/data bus 610. In some embodiments, the memory 430 includes or further includes substantially non-volatile memory such as, but not limited to, read-only memory (ROM), erasable programmable ROM (EPROM), electrically erasable programmable ROM (EEPROM), and flash memory. The substantially non-volatile memory may be coupled to the address/data buss 410 to provide non-volatile storage of information and instructions to be used by the processor 420, for example.

According to some embodiments, the processor 420 may be configured to one or both of execute instructions (e.g., a computer program) and employ data stored in a remote or online data storage unit such as in so-called 'cloud' computing. In these embodiments, the memory 430 may comprise the online data storage unit. According to some embodiments, the memory 430 may comprise a non-transitory computer readable medium, for example, as described above, and may include or be encoded with instructions (e.g., computer program instructions) that, when executed by the processor 420, implement neuromorphic image processing according to various embodiments of the present invention.

In some embodiments, the general-purpose computer 400 may further comprise an interface 440, as illustrated in FIG. 8. The interface 440 may be coupled to the address/data bus 410, for example. According to various embodiments, the interface 440 is configured to interface or communicate with other electronic devices and computer systems. According to various embodiments, the interface 440 may include various communications technology such as wired or wireline interfaces (e.g., serial cables, modems, network adapters, etc.) and wireless interfaces (e.g., WiFi and other wireless modems, wireless network adapters, etc.).

In some embodiments, the general-purpose computer 400 may further comprise a user interface 450 coupled to the address/data bus 410. The user interface 450 may include, but is not limited to, an input device (e.g., keyboard, mouse, track-pad, touch screen, etc.) configured to communicate information and commands from a user to the processor 420 and a display device configured to communicate information from the processor 420 to a user. According to various examples, the display device may include, but is not limited to, a cathode ray tube (CRT), a liquid crystal display (LCD), a field emission display (FED), a plasma display, and substantially any other display device suitable for displaying information (e.g., video, alphanumeric data, etc.) to a user.

In some embodiments, the general-purpose computer 400 may further comprise computer useable data storage 460. According to some embodiments, the computer useable data storage 460 is coupled to the address/data bus 410 and is configured to store information including, but not limited to, computer executable instructions (e.g., a computer program). For example, the computer useable data storage 460 may comprise a non-transitory computer readable medium and may store or be encoded with instructions (e.g., stored computer program instructions) that, when executed by the processor 420, implement neuromorphic image processing according to embodiments of the present invention. According to various embodiments, the computer useable data storage 460 may include, but is not limited to, a magnetic or optical disk drive, e.g., a hard disk drive (HDD), a floppy disk drive (FDD), a compact disc read-only memory (CD-ROM), a digital versatile disk (DVD), a thumb drive, etc. In some embodiments the computer useable data storage 460 may include or further include, network attached storage, cloud storage, etc.

The general-purpose computer 400 described herein is an example of a computing environment that may be employed to implement embodiments of the present invention (e.g., the neuromorphic image processing channel 100, the neuromorphic image processing system 200, or the method 300 of neuromorphic image processing). However, implementation is not restricted to using a general-purpose computer 400, as illustrated in FIG. 8. For example, other computing systems and computing environments including, but not limited to, a virtual computing environment and various specialized processing systems may be employed. In particular, according to some embodiments, one or more operations of various embodiments of the present invention may be controlled or implemented using computer-executable instructions, such as computer program modules, which are executed by a computer including, but not limited to, the general-purpose computer 400. According to some embodiments, such computer program modules may include routines, programs, object components and data structures configured to perform particular tasks or implement particular abstract data types, for example. In addition, some embodiments provide that one or more aspects of the present invention may be implemented by utilizing a distributed computing environment, such as where tasks are performed by remote processing devices that are linked through a communications network, or such as where various program modules are located in both local and remote computer-storage media including memory-storage devices, for example.

Thus, there have been described examples of a neuromorphic image processing channel, a neuromorphic image processing system and a method of neuromorphic image processing that employ neuromorphic neurons arranged as relay neurons, interneurons and reticular neurons. It should be understood that the above-described examples are merely illustrative of some of the many specific examples and embodiments that represent the principles consistent with the principles described herein. Clearly, those skilled in the art can readily devise numerous other arrangements without departing from the scope consistent with the principles described herein as defined by the following claims.

What is claimed is:

1. A neuromorphic image processing channel comprising:
   a plurality of relay neurons to receive spiking input signals from an image source;
   a plurality of interneurons to provide feed-forward inhibition to relay neurons of the relay neuron plurality according to a one-to-many mapping, an interneuron of the interneuron plurality to receive a set of the spiking input signals according to a many-to-one mapping into the interneuron; and
   a plurality of reticular neurons to receive output spiking signals from relay neurons of the relay neuron plurality and to provide feedback inhibition to the relay neurons, wherein the relay neurons, the interneurons, and the reticular neurons of the respective pluralities comprise thalamus-like neuromorphic neurons, and wherein a quantity of the relay neurons exceeds each of a quantity of the interneurons and a quantity of the reticular neurons.

2. The neuromorphic image processing channel of claim 1, wherein a set of the relay neurons of the relay neuron plurality corresponding to a spiking input signal is to receive the spiking input signal according to a one-to-many mapping, the one-to-many mapping conforming to a two-dimensional (2-D) Gaussian pattern in one or both of connection probability and connection strength within the corresponding set of the relay neurons.

3. The neuromorphic image processing channel of claim 1, wherein the interneuron-to-relay neuron one-to-many mapping conforms to a two-dimensional (2-D) Gaussian pattern in one or both of connection probability and connection strength within the corresponding set of relay neurons.

4. The neuromorphic image processing channel of claim 1,
   wherein a set of relay neurons of the relay neuron plurality is connected to a corresponding reticular neuron of the reticular neuron plurality according to a many-to-one mapping to provide the output spiking signals from the set of relay neurons to the corresponding reticular neuron, and
   wherein a reticular neuron of the reticular neuron plurality is connected to a corresponding set of relay neurons of the relay neuron plurality according to a one-to-many mapping to provide the feedback inhibition to the corresponding set of relay neurons.

5. The neuromorphic image processing channel of claim 4, wherein the one-to-many mapping conforms to a two-dimensional (2-D) Gaussian pattern in one or both of connection probability and connection strength within the corresponding set of relay neurons.

6. The neuromorphic image processing channel of claim 1, wherein a relay neuron of the relay neuron plurality is an Izhikevich neuromorphic neuron configured to provide both tonic firing patterns and burst firing patterns with the burst firing patterns to occur after hyperpolarization.

7. The neuromorphic image processing channel of claim 1, wherein an interneuron of the interneuron plurality is an Izhikevich neuromorphic neuron configured to provide rebound spiking after hyperpolarization with substantially no burst mode.

8. The neuromorphic image processing channel of claim 1, wherein a reticular neuron of the reticular neuron plurality is an Izhikevich neuromorphic neuron configured to provide both tonic firing patterns and burst firing patterns with a firing rate of the reticular neuron that is less than a firing rate of the relay neurons of the relay neuron plurality.

9. The neuromorphic image processing channel of claim 1, wherein the quantity of the interneurons is about twenty percent of a sum of the quantity of the relay neurons plus the quantity of the interneurons, and wherein the quantity of the reticular neurons is about equal to the quantity of the interneurons.

10. A neuromorphic image processing system comprising:
    a first neuromorphic image processing channel to receive parvocellular spiking input signals to facilitate form processing; and
    a second neuromorphic image processing channel to receive magnocellular spiking input signals to facilitate motion processing,
    wherein one or both of the first neuromorphic image processing channel and the second neuromorphic image processing channel comprises the neuromorphic image processing channel of claim 1, and wherein the reticular neurons of the reticular neuron plurality are shared by both of the first and second neuromorphic image processing channels.

11. The neuromorphic image processing channel of claim 1, further comprising the image source configured to provide spiking signals as the spiking input signals.

12. A neuromorphic image processing system comprising:
a first neuromorphic image processing (NIP) channel having first relay neurons and first interneurons to receive a first set of spiking input signals from an image source, the first NIP channel interneurons to provide feed-forward inhibition to the first NIP channel relay neurons;
a second NIP channel having second relay neurons and second interneurons to receive a second set of spiking input signals from the image source, the second NIP channel interneurons to provide feed-forward inhibition to the second NIP channel relay neurons; and
reticular neurons to receive output spiking signals from both the first NIP channel relay neurons and the second NIP channel relay neurons and to provide feedback inhibition to the first NIP channel relay neurons and the second NIP channel relay neurons,
wherein the first and second relay neurons, the first and second interneurons, and the reticular neurons comprise neuromorphic neurons that exhibit thalamus-like properties, and wherein the spiking input signals represent image data.

13. The neuromorphic image processing system of claim 12,
wherein a spiking input signal is to be received by both the first and second NIP channels according to a one-to-many mapping of the spiking input signal into a set of the relay neurons of the respective NIP channels, the one-to-many mapping conforming to a two-dimensional (2-D) Gaussian pattern in one or both of connection probability and connection strength within the set of the respective NIP channels relay neurons.

14. The neuromorphic image processing system of claim 12, wherein an interneuron of the first NIP channel is connected to a set of first NIP channel relay neurons according to a one-to-many mapping to provide the feed-forward inhibition to the first NIP channel relay neuron set, and wherein an interneuron of the second NIP channel is connected to a set of second NIP channel relay neurons according to a one-to-many mapping to provide the feed-forward inhibition to the second NIP channel relay neuron set, the one-to-many mappings conforming to a two-dimensional (2-D) Gaussian pattern within the sets of the respective first and second NIP channels relay neurons.

15. The neuromorphic image processing system of claim 12, wherein a quantity of the first NIP channel relay neurons exceeds each of a quantity of the first NIP channel interneurons and a quantity of the reticular neurons.

16. The neuromorphic image processing system of claim 12, wherein a neuromorphic neuron of one or both of the first NIP channel and the second NIP channel comprises an Izhikevich neuromorphic neuron.

17. The neuromorphic image processing system of claim 12, wherein the first set of spiking input signals represent parvocellular spiking input signals and the second set of spiking input signals represent magnocellular spiking input signals, the first NIP channel being form-oriented to facilitate form processing and the second NIP channel being motion-oriented to facilitate motion processing.

18. The neuromorphic image processing system of claim 12, further comprising:

a third NIP channel having third relay neurons and third interneurons to receive a third set of spiking input signals, the third NIP channel interneurons to provide feed-forward inhibition to the third NIP channel relay neurons, the reticular neurons to further receive output spiking signals from the third NIP channel relay neurons and to provide feedback inhibition to the third NIP channel relay neurons,
wherein the third set of spiking input signals are temporally delayed with respect to one or both of the first spiking input signal set and the second spiking input signal set.

19. The neuromorphic image processing system of claim 12, wherein the first and second NIP channels are implemented using a synaptic time-multiplexed (STM) neuromorphic network.

20. The neuromorphic image processing system of claim 12, further comprising:
a processor;
a memory; and
a computer program stored in the memory and having instructions that, when executed by the processor, implement one or both of the first NIP channel and the second NIP channel.

21. A method of neuromorphic image processing exhibiting thalamus-like properties, the method comprising:
receiving spiking input signals with a plurality of relay neurons and a plurality of interneurons, the spiking input signals being provided by an image processing input source, an interneuron of the interneuron plurality receiving a set of the spiking input signals according to a many-to-one mapping of the set of spiking input signals;
providing feed-forward inhibition to the plurality of relay neurons from the plurality of interneurons according to a one-to-many mapping of an interneuron of the interneuron plurality to a set of relay neurons corresponding to the interneuron;
receiving output spiking signals from the plurality of relay neurons with a plurality of reticular neurons; and
providing feedback inhibition to the plurality of relay neurons from the plurality of reticular neurons,
wherein the relay neurons, the interneurons, and the reticular neurons of the respective pluralities comprise neuromorphic neurons with thalamus-like properties, and wherein a quantity of the relay neurons exceeds each of a quantity of interneurons and a quantity of reticular neurons.

22. The method of neuromorphic image processing of claim 21, wherein a spiking input signal is received by a set of relay neurons of the relay neuron plurality according to a one-to-many mapping, the one-to-many mapping conforming to a two-dimensional (2-D) Gaussian pattern within the corresponding set of the relay neurons.

23. The method of neuromorphic image processing of claim 21, wherein the one-to-many mapping of the interneuron into the set of the relay neurons conforms to a two-dimensional (2-D) Gaussian pattern, and wherein providing feedback inhibition to the relay neurons comprises a one-to-many mapping of an output of a reticular neuron of reticular neuron plurality into a set of the relay neurons corresponding to the reticular neuron.

24. The method of neuromorphic image processing of claim 21, wherein receiving spiking input signals comprises receiving parvocellular spiking input signals and magnocellular spiking input signals, the parvocellular spiking input signals being received by a first neuromorphic image processing (NIP) channel comprising a first plurality of the relay neurons and a first plurality of the interneurons to facilitate form processing, the magnocellular spiking input signals being received by a second NIP channel comprising a second plurality of the relay neurons and a second plurality of the interneurons to facilitate motion processing.

25. The method of neuromorphic image processing of claim 24, wherein receiving spiking input signals further comprises receiving spiking input signals by a third NIP channel, the spiking input signals received by the third NIP channel being temporally delayed with respect to one or both of the parvocellular spiking input signals and the magnocellular spiking input signals received by the first NIP channel and the second NIP channel, respectively.

26. A non-transitory computer readable medium including instructions that, when executed by a processor, implement the method of neuromorphic image processing of claim 21.

\* \* \* \* \*